US009874167B2

(12) United States Patent
MacEwen et al.

(10) Patent No.: US 9,874,167 B2
(45) Date of Patent: Jan. 23, 2018

(54) CONTROL SYSTEMS AND METHODS FOR AIR FUEL IMBALANCE AND CYLINDER DEACTIVATION

(71) Applicant: GM Global Technology Operations LLC, Detroit, MI (US)

(72) Inventors: Ian J. MacEwen, White Lake, MI (US); David A. Gorajek, South Lyon, MI (US); Douglas J. Moening, Highland, MI (US); Daniel W. Jecks, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/176,643

(22) Filed: Jun. 8, 2016

(65) Prior Publication Data
US 2017/0356362 A1  Dec. 14, 2017

(51) Int. Cl.
*F02D 41/00* (2006.01)
*F02D 11/10* (2006.01)
(Continued)

(52) U.S. Cl.
CPC ........ *F02D 41/0087* (2013.01); *F02D 11/105* (2013.01); *F02D 13/06* (2013.01);
(Continued)

(58) Field of Classification Search
CPC ...... F02D 11/105; F02D 13/06; F02D 41/008; F02D 41/0085; F02D 41/0087;
(Continued)

(56) References Cited

U.S. PATENT DOCUMENTS 5,535,135 A   7/1996  Bush et al.
5,845,491 A  12/1998  Yasui et al.
(Continued)

FOREIGN PATENT DOCUMENTS

JP     6073022     4/1985

OTHER PUBLICATIONS

U.S. Appl. No. 14/989,363, filed Jan. 6, 2016, Tylutki et al.
(Continued)

*Primary Examiner* — John Kwon
*Assistant Examiner* — Johnny H Hoang

(57) ABSTRACT

A torque request module determines a torque request for an engine based on a driver input. A cylinder control module determines a target fraction of a total number of cylinders of the engine to be activated based on the torque request. An air fuel imbalance (AFIM) module selectively commands that the cylinder control module set the target fraction based on a predetermined fraction of the total number of cylinders of the engine to be activated. The cylinder control module further: sets the target fraction based on the predetermined fraction in response to the command; and activates and deactivates opening of intake and exhaust valves of the cylinders of the engine based on the target fraction. The AFIM module further, while the target firing fraction is set based on the predetermined fraction, selectively diagnoses the presence of an AFIM fault based on samples of a signal from an oxygen sensor.

19 Claims, 13 Drawing Sheets

(51) Int. Cl.
*F02D 13/06* (2006.01)
*F02D 41/14* (2006.01)
*F02D 41/22* (2006.01)

(52) U.S. Cl.
CPC ....... *F02D 41/009* (2013.01); *F02D 41/1439* (2013.01); *F02D 41/1454* (2013.01); *F02D 2041/224* (2013.01); *F02D 2041/228* (2013.01)

(58) Field of Classification Search
CPC .............. F02D 41/009; F02D 41/1439; F02D 41/1454; F02D 2041/224; F02D 2041/228
USPC ....... 123/673, 674, 198 DB, 198 F; 701/103, 701/104, 114; 73/35.01, 35.02, 114.72, 73/114.73
See application file for complete search history.

(56) References Cited

U.S. PATENT DOCUMENTS

| | | | |
|---|---|---|---|
| 6,021,758 A | 2/2000 | Carey et al. |
| 6,026,793 A | 2/2000 | Yasui et al. |
| 6,029,641 A | 2/2000 | Suzuki et al. |
| 6,032,659 A | 3/2000 | Yamashita et al. |
| 6,125,831 A | 10/2000 | Yasui et al. |
| 6,314,952 B1 | 11/2001 | Turin et al. |
| 6,382,198 B1 | 5/2002 | Smith et al. |
| 6,481,427 B1 | 11/2002 | Javaherian |
| 6,510,329 B2 | 1/2003 | Heckel |
| 6,668,812 B2 | 12/2003 | Javaherian |
| 6,726,819 B2 | 4/2004 | Atsumi et al. |
| 6,996,974 B2 | 2/2006 | Anilovich et al. |
| 7,024,302 B2 | 4/2006 | Mizuno et al. |
| 7,027,910 B1 | 4/2006 | Javaherian et al. |
| 7,043,899 B2 | 5/2006 | Wang et al. |
| 7,152,594 B2 | 12/2006 | Anilovich et al. |
| 7,248,960 B2 | 7/2007 | Ikemoto et al. |
| 7,445,698 B2 | 11/2008 | Hada et al. |
| 7,802,563 B2 | 9/2010 | Behr et al. |
| 7,900,615 B2 | 3/2011 | Wang et al. |
| 8,042,211 B2 | 10/2011 | Stansel et al. |
| 8,413,497 B2 | 4/2013 | Kayama et al. |
| 8,577,645 B2 | 11/2013 | Turin et al. |
| 9,027,539 B2 | 5/2015 | Miyashita |
| 2004/0030484 A1 | 2/2004 | Yasui et al. |
| 2005/0204727 A1* | 9/2005 | Lewis ....................... F01L 9/04 60/285 |
| 2005/0205046 A1* | 9/2005 | Lewis ................. F02D 13/0215 123/198 F |
| 2007/0125347 A1 | 6/2007 | Nakagawa et al. |
| 2009/0084082 A1 | 4/2009 | Martin et al. |
| 2010/0082297 A1* | 4/2010 | Turin .................. F02D 41/0085 702/183 |
| 2010/0162806 A1* | 7/2010 | Huang ................ F02D 41/0085 73/114.72 |
| 2011/0153181 A1* | 6/2011 | Bagnasco ............... F01L 13/00 701/109 |
| 2012/0035831 A1* | 2/2012 | Kidokoro ............ F02D 41/0085 701/104 |
| 2012/0253642 A1* | 10/2012 | Kitano ................ F02D 41/0085 701/104 |
| 2013/0006506 A1* | 1/2013 | Takada ................ F02D 41/0085 701/108 |
| 2013/0184969 A1* | 7/2013 | Rollinger ................ F02D 41/22 701/103 |
| 2014/0261309 A1* | 9/2014 | Chen .................. F02D 41/0082 123/320 |
| 2016/0003710 A1* | 1/2016 | Qiao .................... G01M 15/104 73/23.32 |
| 2016/0258376 A1* | 9/2016 | Jammoussi ........... F02D 41/123 |

OTHER PUBLICATIONS

Steven W. Smith, "The Scientist and Engineer's Guide to Digital Signal Processing", copyright .COPYRGT. 1997-1998, http://www.dspguide.com/ch2/2.htm.

Jeff L. Kainz et al., "Individual Cylinder Fuel Control with a Switching Oxygen Sensor", SAE Technical Paper Series, 1999-01-0546, SAE International Congress and Exposition, Detroit, Michigan, Mar. 1-4, 1999.

\* cited by examiner

FIG. 10

CONTROL SYSTEMS AND METHODS FOR AIR FUEL IMBALANCE AND CYLINDER DEACTIVATION

FIELD

The present disclosure is related to internal combustion engines and more particularly to air fuel imbalance and cylinder activation/deactivation control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A fuel control system controls provision of fuel to an engine. The fuel control system includes an inner control loop and an outer control loop. The inner control loop may use data from an exhaust gas oxygen (EGO) sensor located upstream from a catalyst in an exhaust system. The catalyst receives exhaust gas output by the engine.

The inner control loop controls the amount of fuel provided to the engine based on the data from the upstream EGO sensor. For example only, when the upstream EGO sensor indicates that the exhaust gas is (fuel) rich, the inner control loop may decrease the amount of fuel provided to the engine. Conversely, the inner control loop may increase the amount of fuel provided to the engine when the exhaust gas is lean. Adjusting the amount of fuel provided to the engine based on the data from the upstream EGO sensor modulates the air/fuel mixture combusted within the engine at approximately a target air/fuel mixture (e.g., a stoichiometry mixture).

The outer control loop may use data from an EGO sensor located downstream from the catalyst. For example only, the outer control loop may use the data from the upstream and downstream EGO sensors to determine an amount of oxygen stored by the catalyst and other suitable parameters. The outer control loop may also use the data from the downstream EGO sensor to correct the data provided by the upstream and/or downstream EGO sensors when the downstream EGO sensor provides unexpected data.

SUMMARY

In a feature, an engine control system of a vehicle is described. A torque request module determines a torque request for an engine based on a driver input. A cylinder control module determines a target fraction of a total number of cylinders of the engine to be activated based on the torque request. An air fuel imbalance (AFIM) module selectively commands that the cylinder control module set the target fraction based on a predetermined fraction of the total number of cylinders of the engine to be activated. The cylinder control module further: sets the target fraction based on the predetermined fraction in response to the command; and activates and deactivates opening of intake and exhaust valves of the cylinders of the engine based on the target fraction. The AFIM module further, while the target firing fraction is set based on the predetermined fraction, selectively diagnoses the presence of an AFIM fault based on samples of a signal from an oxygen sensor measuring oxygen in exhaust upstream of a catalyst of an exhaust system.

In further features, a fuel control module provides fuel to cylinders having activated intake and exhaust valves based on the target fraction and disables fueling to cylinders having deactivated intake and exhaust valves based on the target fraction.

In further features, the AFIM module stores a predetermined diagnostic trouble code (DTC) in memory when the AFIM fault is present.

In further features, the AFIM module illuminates an indicator when the AFIM fault is present.

In further features: the AFIM module commands that the cylinder control module set the target fraction equal to the predetermined fraction; and the cylinder control module sets the target fraction equal to the predetermined fraction in response to the command.

In further features, the AFIM module commands that the cylinder control module set the target fraction one of (i) greater than the predetermined fraction and (ii) equal to the predetermined fraction, and the cylinder control module: when the predetermined fraction is greater than the target fraction determined based on the torque request, sets the target fraction equal to the predetermined fraction; and when the predetermined fraction is less than the target fraction determined based on the torque request, sets the target fraction equal to the target fraction determined based on the torque request.

In further features, the AFIM module commands that the cylinder control module set the target fraction based on the predetermined fraction in response to determinations that an engine speed is within a predetermined speed range and that an engine load is within a predetermined engine load range.

In further features, the AFIM module commands that the cylinder control module set the target fraction based on the predetermined fraction, independent of engine speed and independent of engine load.

In a feature, an engine control system of a vehicle is described. A torque request module determines a torque request for an engine based on a driver input. A cylinder control module determines a target fraction of a total number of cylinders of the engine to be activated based on the torque request and that determines a target firing sequence for the cylinders to achieve the target fraction. An air fuel imbalance (AFIM) module selectively commands that the cylinder control module set the target firing sequence to a predetermined firing sequence. The cylinder control module further: sets the target firing sequence to the predetermined firing sequence in response to the command; and activates and deactivates opening of intake and exhaust valves of the cylinders of the engine in order according to the predetermined firing sequence. The AFIM module further, while the target firing sequence is set to the predetermined firing sequence, selectively diagnoses the presence of an AFIM fault based on samples of a signal from an oxygen sensor measuring oxygen in exhaust upstream of a catalyst of an exhaust system.

In further features, a fuel control module provides fuel to cylinders having activated intake and exhaust valves based on the target firing sequence and that disables fueling to cylinders having deactivated intake and exhaust valves based on the target firing sequence.

In further features, the AFIM module stores a predetermined diagnostic trouble code (DTC) in memory when the AFIM fault is present.

In further features, the AFIM module illuminates an indicator when the AFIM fault is present.

In further features, the AFIM module commands that the cylinder control module set the target firing sequence based on the predetermined firing sequence in response to determinations that an engine speed is within a predetermined speed range and that an engine load is within a predetermined engine load range.

In further features, the AFIM module commands that the cylinder control module set the target firing sequence based on the predetermined firing sequence, independent of engine speed and independent of engine load.

In a feature, an engine control system of a vehicle is described. A torque request module determines a torque request for an engine based on a driver input. A cylinder control module determines a target fraction of a total number of cylinders of the engine to be activated based on the torque request and that activates and deactivates opening of intake and exhaust valves of the cylinders of the engine based on the target fraction. An air fuel imbalance (AFIM) module selectively diagnoses the presence of an AFIM fault based on samples of a signal from an oxygen sensor measuring oxygen in exhaust upstream of a catalyst of an exhaust system received when the target fraction is greater than a predetermined minimum fraction of the total number of cylinders of the engine.

In further features, the AFIM module selectively diagnoses the presence of an AFIM fault based on samples of the signal from the oxygen sensor when both (i) the target fraction is greater than the predetermined minimum fraction of the total number of cylinders of the engine and (ii) an engine speed is within a predetermined engine speed range.

In further features, the AFIM module selectively diagnoses the presence of an AFIM fault based on samples of the signal from the oxygen sensor when all of: (i) the target fraction is greater than the predetermined minimum fraction of the total number of cylinders of the engine; (ii) an engine speed is within a predetermined engine speed range; and (iii) an engine load is within a predetermined engine load range.

In further features, a fuel control module provides fuel to cylinders having activated intake and exhaust valves based on the target fraction and that disables fueling to cylinders having deactivated intake and exhaust valves based on the target fraction.

In further features, the AFIM module stores a predetermined diagnostic trouble code (DTC) in memory when the AFIM fault is present.

In further features, the AFIM module illuminates an indicator when the AFIM fault is present.

In a feature, an engine control method for a vehicle is described. The engine control method includes: determining a torque request for an engine based on a driver input; determining a target fraction of a total number of cylinders of the engine to be activated based on the torque request; selectively commanding that the target fraction be set based on a predetermined fraction of the total number of cylinders of the engine to be activated; setting the target fraction based on the predetermined fraction in response to the command; activating and deactivating opening of intake and exhaust valves of the cylinders of the engine based on the target fraction; and while the target firing fraction is set based on the predetermined fraction, selectively diagnoses the presence of an air fuel imbalance (AFIM) fault based on samples of a signal from an oxygen sensor measuring oxygen in exhaust upstream of a catalyst of an exhaust system. The engine control method may also include: providing fuel to cylinders having activated intake and exhaust valves based on the target fraction and disabling fueling to cylinders having deactivated intake and exhaust valves based on the target fraction. The engine control method may also further include: storing a predetermined diagnostic trouble code (DTC) in memory when the AFIM fault is present. The engine control method may also further include: illuminating an indicator when the AFIM fault is present. In various implementations, commanding may include commanding that the target fraction be set equal to the predetermined fraction; and setting the target fraction equal to the predetermined fraction in response to the command. In various implementations: commanding may include commanding that the target fraction be set to one of (i) greater than the predetermined fraction and (ii) equal to the predetermined fraction; and setting the target fraction may include: when the predetermined fraction is greater than the target fraction determined based on the torque request, setting the target fraction equal to the predetermined fraction; and when the predetermined fraction is less than the target fraction determined based on the torque request, setting the target fraction equal to the target fraction determined based on the torque request. The engine control method may also include commanding the setting of the target fraction based on the predetermined fraction in response to determinations that an engine speed is within a predetermined speed range and that an engine load is within a predetermined engine load range. Alternatively, the engine control method may also include commanding the setting of the target fraction based on the predetermined fraction, independent of engine speed and independent of engine load.

In a feature, an engine control method for a vehicle is described. The engine control method includes: determining a torque request for an engine based on a driver input; determining a target fraction of a total number of cylinders of the engine to be activated based on the torque request; determining a target firing sequence for the cylinders to achieve the target fraction; selectively commanding setting of the target firing sequence to a predetermined firing sequence; setting the target firing sequence to the predetermined firing sequence in response to the command; and activating and deactivating opening of intake and exhaust valves of the cylinders of the engine in order according to the predetermined firing sequence; and, while the target firing sequence is set to the predetermined firing sequence, selectively diagnoses the presence of an air fuel imbalance (AFIM) fault based on samples of a signal from an oxygen sensor measuring oxygen in exhaust upstream of a catalyst of an exhaust system. The engine control method may also include: providing fuel to cylinders having activated intake and exhaust valves based on the target firing sequence and disabling fueling to cylinders having deactivated intake and exhaust valves based on the target firing sequence. The engine control method may also include: storing a predetermined diagnostic trouble code (DTC) in memory when the AFIM fault is present. The engine control method may also include: illuminating an indicator when the AFIM fault is present. In various implementations, the engine control method may include commanding the setting of the target firing sequence based on the predetermined firing sequence in response to determinations that an engine speed is within a predetermined speed range and that an engine load is within a predetermined engine load range. In various implementations, the engine control method may include commanding the setting of the target firing sequence based on the predetermined firing sequence, independent of engine speed and independent of engine load.

In a feature, an engine control method for a vehicle is described. The engine control method includes: determining a torque request for an engine based on a driver input; determining a target fraction of a total number of cylinders of the engine to be activated based on the torque request; activating and deactivating opening of intake and exhaust valves of the cylinders of the engine based on the target fraction; selectively diagnosing the presence of an AFIM fault based on samples of a signal from an oxygen sensor measuring oxygen in exhaust upstream of a catalyst of an exhaust system received when the target fraction is greater than a predetermined minimum fraction of the total number of cylinders of the engine. The engine control method may include selectively diagnosing the presence of an AFIM fault based on samples of the signal from the oxygen sensor when both (i) the target fraction is greater than the predetermined minimum fraction of the total number of cylinders of the engine and (ii) an engine speed is within a predetermined engine speed range. The engine control method may include selectively diagnosing the presence of an AFIM fault based on samples of the signal from the oxygen sensor when all of: (i) the target fraction is greater than the predetermined minimum fraction of the total number of cylinders of the engine; (ii) an engine speed is within a predetermined engine speed range; and (iii) an engine load is within a predetermined engine load range. The engine control method may also include providing fuel to cylinders having activated intake and exhaust valves based on the target fraction and disabling fueling to cylinders having deactivated intake and exhaust valves based on the target fraction. The engine control method may also include storing a predetermined diagnostic trouble code (DTC) in memory when the AFIM fault is present. The engine control method may also include illuminating an indicator when the AFIM fault is present.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 10 includes example illustrations of firing sequences for various firing fractions.

In the drawings, reference numbers may be reused to identify similar and/or identical elements.

DETAILED DESCRIPTION

Internal combustion engines combust an air and fuel mixture within cylinders to generate torque. Under some circumstances, an engine control module (ECM) may deactivate one or more cylinders of the engine. The ECM may deactivate one or more cylinders, for example, to decrease fuel consumption when the engine can produce a requested amount of torque while one or more cylinders are deactivated.

The ECM determines a target firing fraction based on a requested amount of torque. The target firing fraction may correspond to a fraction of the cylinders that should be activated to achieve the requested amount of torque. The ECM determines a target firing sequence to achieve the target firing fraction and generates a firing command for a future (e.g., next) cylinder in a predetermined firing order of the cylinders according to the target firing sequence. The firing command may be a value that indicates whether the future cylinder should be activated or deactivated. For example, the ECM may set the firing command to 1 when the future cylinder should be activated and set the firing command to 0 when the future cylinder should be deactivated.

The ECM also selectively determines whether an air/fuel imbalance (AFIM) fault is present across the cylinders. Accuracy and/or reliability of the AFIM fault diagnostic, however, be affected by some target firing fractions. The ECM of the present disclosure may therefore use a predetermined firing fraction or at least a predetermined minimum firing fraction for the performance of the AFIM fault diagnostic. Additionally or alternatively, the ECM may use a predetermined firing sequence for the performance of the AFIM fault diagnostic.

Figure 1:
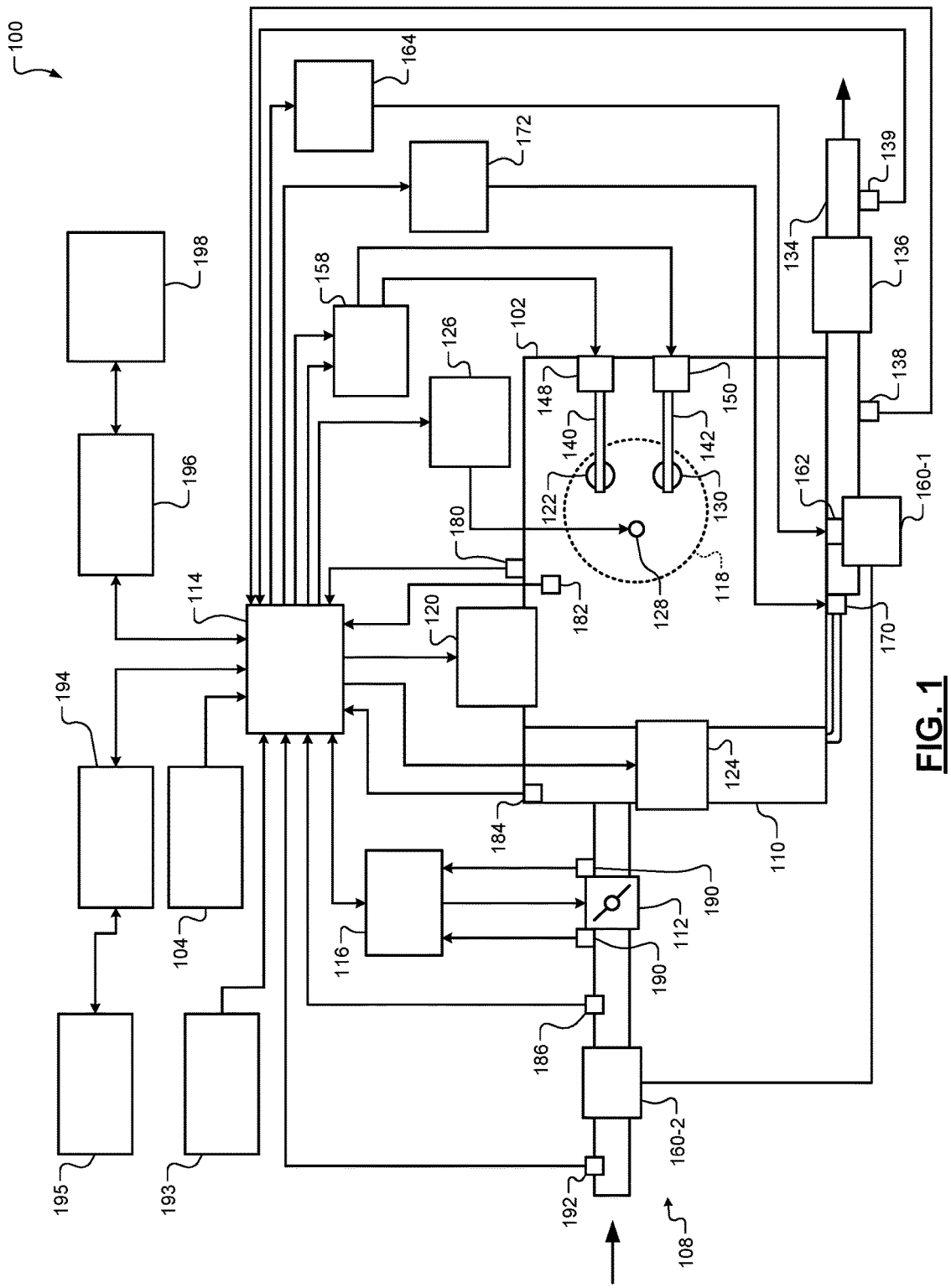
FIG. 1 is a functional block diagram of an example engine system.

Referring now to FIG. 1, a functional block diagram of an example engine system 100 is presented. The engine system 100 of a vehicle includes an engine 102 that combusts an air/fuel mixture to produce torque based on driver input from a driver input module 104.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134. The exhaust system 134 includes a catalyst 136, such as a three-way catalyst (TWC) or a four-way catalyst. The catalyst 136 reacts with components of the exhaust, such as nitrogen oxides (NOx), carbon monoxide (CO), Carbon dioxide ($CO_2$), etc.

An upstream exhaust gas oxygen (EGO) sensor (US EGO sensor) 138 is located upstream from the catalyst 136. A downstream EGO sensor (DS EGO sensor) 139 is located downstream from the catalyst 136. The US EGO sensor 138 may be located, for example, at a confluence point of exhaust runners of an exhaust manifold or at another suitable location.

The US and DS EGO sensors 138 and 139 measure an amount of oxygen in the exhaust at their respective locations and generate an EGO signal based on the amounts of oxygen. For example only, the US EGO sensor 138 generates an upstream EGO (US EGO) signal based on the amount of oxygen upstream of the catalyst 136. The DS EGO sensor 139 generates a downstream EGO (DS EGO) signal based on the amount of oxygen downstream of the catalyst 136.

The US and DS EGO sensors 138 and 139 may each include a universal EGO (UEGO) sensor (also referred to as a wide band or wide range EGO sensor), or another suitable type of EGO sensor. EGO sensors can also be referred to as air/fuel ratio sensors. For example, a wide range EGO sensor may be referred to as a wide range air/fuel (WRAF) sensor. A switching EGO sensor generates an EGO signal in units of voltage, and switches the EGO signal between a low voltage (e.g., approximately 0.2 V) and a high voltage (e.g., approximately 0.8 V) when the oxygen concentration is lean and rich, respectively. By way of contrast, a UEGO sensor generates an EGO signal that corresponds to an equivalence ratio (EQR) of the exhaust gas and provides measurements between rich and lean.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include one or more boost devices, such as a turbocharger or a supercharger, that provide(s) pressurized air to the intake manifold 110. For example, FIG. 1 shows a turbocharger including a turbocharger turbine 160-1 that is driven by exhaust gases flowing through the exhaust system 134. The turbocharger also includes a turbocharger compressor 160-2 that is driven by the turbocharger turbine 160-1 and that compresses air leading into the throttle valve 112. As discussed further below, the engine system 100 may include more than one boost device, such as sequential or parallel turbochargers.

A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162. In various implementations, multiple turbochargers may be controlled by the wastegate actuator module 164. The turbocharger(s) may have variable geometry, which may be controlled by a turbo actuator module (not shown).

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger turbine 160-1. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The other sensors 193 may include, for example, an oxygen sensor located upstream of the catalyst 136, an oxygen sensor located downstream of the catalyst 136, an ambient air pressure sensor, and/or other suitable sensors. The oxygen sensor upstream of the catalyst 136 measures an amount of oxygen flowing into the catalyst 136. The oxygen sensor located downstream of the catalyst 136 measures an amount of oxygen flowing out of the catalyst 136. The ECM 114 may use signals from the sensors to make control decisions for the engine system 100.

The other sensors 193 include an accelerator pedal position (APP) sensor, may include a clutch pedal position (CPP) sensor (e.g., in the case of a manual transmission), and may include one or more other types of sensors. An APP sensor measures a position of an accelerator pedal within a passenger cabin of the vehicle. A CPP sensor measures a position of a clutch pedal within the passenger cabin of the vehicle. The other sensors 193 may also include one or more acceleration sensors that measure longitudinal acceleration of the vehicle.

The ECM 114 may communicate with a transmission control module 194, for example, to coordinate engine operation with gear shifts in a transmission 195. For example, the ECM 114 may reduce engine torque during a gear shift.

The ECM 114 may communicate with a hybrid control module 196, for example, to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

The ECM 114 starts and shuts down the engine 102 between times when the vehicle is started and when the vehicle is next shut down. A user may start the vehicle, for example, by actuating an ignition key, button, or switch. A user may shut down the vehicle, for example, by actuating the ignition key, button, or switch.

The electric motor 198 may be coupled to the transmission 195 and used for vehicle propulsion and stopping. For example, in some types of vehicles, the engine 102 may be operated only to generate power for the electric motor 198 (e.g., when a state of charge of a battery pack of the vehicle falls below a predetermined state of charge), and the electric motor 198 may be used at all times for vehicle propulsion. In other types of vehicles, the electric motor 198 may be used for vehicle propulsion at times when the engine 102 is shut down and at times when the engine 102 is running (e.g., to supplement engine torque output).

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark timing. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence (or pattern), fueling rate, intake and exhaust cam phaser angles, target wastegate opening, and EGR valve opening, respectively. The ECM 114 may control the actuator values in order to cause the engine 102 to generate a requested engine output torque.

Figure 2:
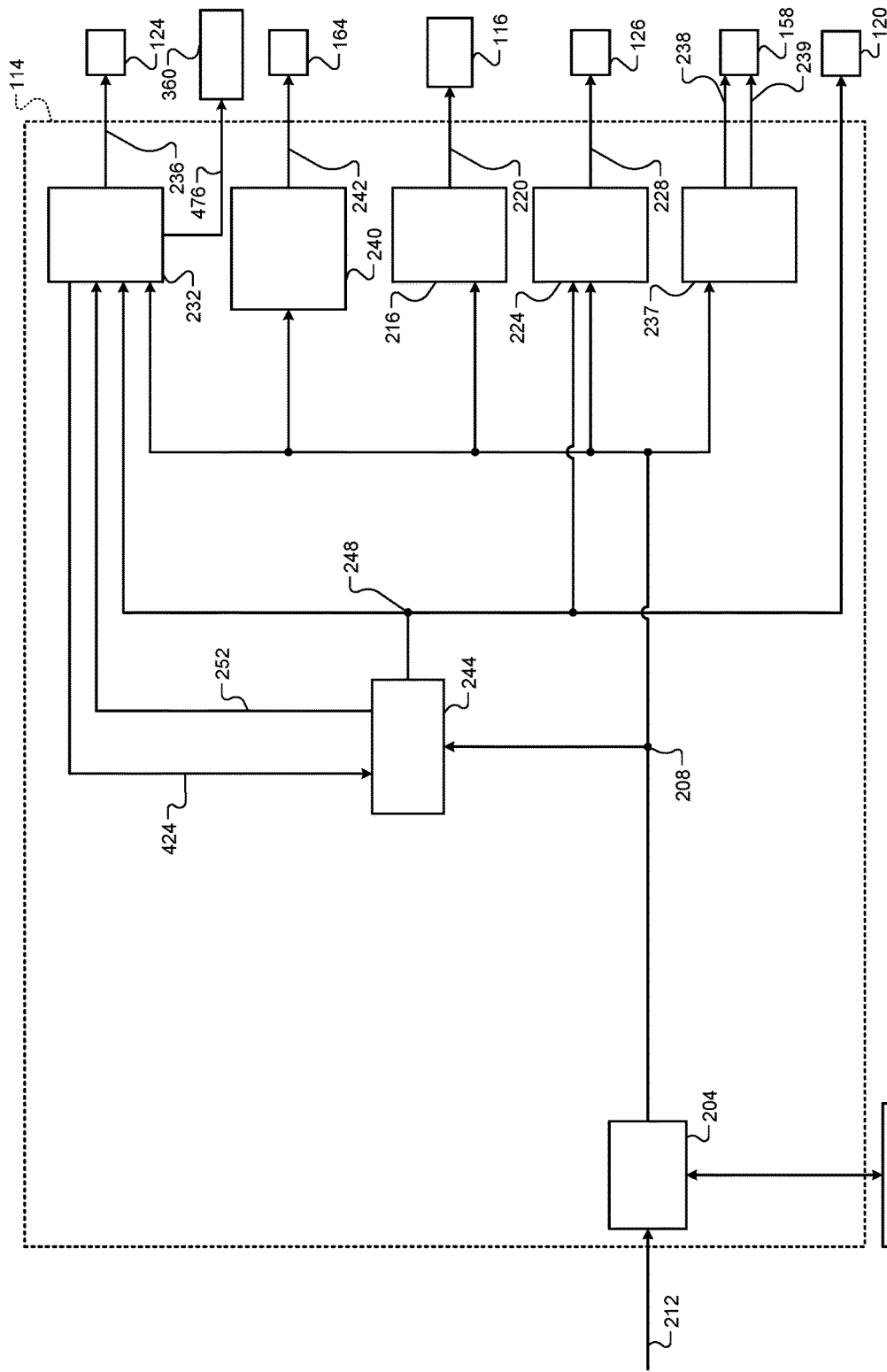
FIG. 2 is a functional block diagram of an example engine control module.

Referring now to FIG. 2, a functional block diagram of an example engine control system is presented. A torque request module 204 determines a torque request 208 for the engine 102 based on one or more driver inputs 212. The driver inputs 212 may include, for example, an accelerator pedal position, a brake pedal position, a cruise control input, and/or one or more other suitable driver inputs. For example, the torque request 208 may increase as the accelerator pedal position increases (relative to a predetermined resting accelerator pedal position, such as zero) and vice versa. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

One or more engine actuators are controlled based on the torque request 208 and/or one or more other parameters. For example, a throttle control module 216 may determine a target throttle opening 220 based on the torque request 208. The throttle actuator module 116 may adjust opening of the throttle valve 112 based on the target throttle opening 220.

A spark control module 224 determines a target spark timing 228 based on the torque request 208. The spark actuator module 126 generates spark based on the target spark timing 228. A fuel control module 232 determines one or more target fueling parameters 236 based on the torque request 208. For example, the target fueling parameters 236 may include a final equivalence ratio (EQR) request, number of fuel injections for injecting the amount, and timing for each of the injections. The fuel actuator module 124 injects fuel based on the target fueling parameters 236. The final EQR request is discussed further below.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively.

A wastegate control module 240 sets a target wastegate opening 242 based on the torque request 208. The wastegate actuator module 164 controls opening of the wastegate 162 based on the target wastegate opening 242. For example only, the wastegate actuator module 164 may determine a target duty cycle (DC) to apply to the wastegate 162 based on the target wastegate opening 242 using a function or mapping that relates target wastegate openings to target DCs. The wastegate actuator module 164 may apply a signal to the wastegate 162 based on the target DC.

A cylinder control module 244 generates an activation/deactivation command 248 for a next cylinder in a predetermined firing order of the cylinders ("the next cylinder"). The activation/deactivation command 248 indicates whether the next cylinder should be activated or deactivated. For example only, the cylinder control module 244 may set the activation/deactivation command 248 to a first state (e.g., 1) when the next cylinder should be activated and set the activation/deactivation command 248 to a second state (e.g., 0) when the next cylinder should be deactivated. While the activation/deactivation command 248 is and will be discussed as being generated for the next cylinder in the predetermined firing order, the activation/deactivation command 248 may be generated for a second cylinder immediately following the next cylinder in the predetermined firing order, a third cylinder immediately following the second cylinder in the predetermined firing order, or another cylinder following the next cylinder in the predetermined firing order.

The cylinder actuator module 120 deactivates the intake and exhaust valves of the next cylinder when the activation/deactivation command 248 indicates that the next cylinder should be deactivated. The cylinder actuator module 120 allows opening and closing of the intake and exhaust valves of the next cylinder when the activation/deactivation command 248 indicates that the next cylinder should be activated.

The fuel control module 232 halts fueling of the next cylinder when the activation/deactivation command 248 indicates that the next cylinder should be deactivated. The fuel control module 232 sets the target fueling parameters 236 to provide fuel to the next cylinder when the activation/deactivation command 248 indicates that the next cylinder should be activated. The spark control module 224 may provide spark to the next cylinder when the activation/deactivation command 248 indicates that the next cylinder should be activated. The spark control module 224 may provide or halt spark to the next cylinder when the activation/deactivation command 248 indicates that the next cylinder should be deactivated.

Cylinder deactivation is different than fuel cutoff (e.g., deceleration fuel cutoff). When a cylinder is deactivated, the cylinder's intake and exhaust valves are maintained closed. When fuel is cutoff to a cylinder, the cylinder's intake and exhaust valves may still be opened and closed.

The cylinder control module 244 may generate the activation/deactivation command 248 based on a target firing fraction (FF) 252. A numerator of the target firing fraction 252 corresponds to a target number of cylinders to be activated (M) out of the next N cylinders in the predetermined firing order of the cylinders, and N is the denominator of the target firing fraction. For example, a target firing fraction of 5/8 indicates that 5 of the next 8 cylinders in the predetermined firing order should be activated. In this example, 3 of the next 8 cylinders in the predetermined firing order should therefore be deactivated. A target firing fraction of 0 corresponds to all of the cylinders of the engine 102 being deactivated (and 0 being activated), and a target firing fraction of 1 corresponds to all of the cylinders of the engine 102 being activated (and 0 being deactivated).

Figure 10:
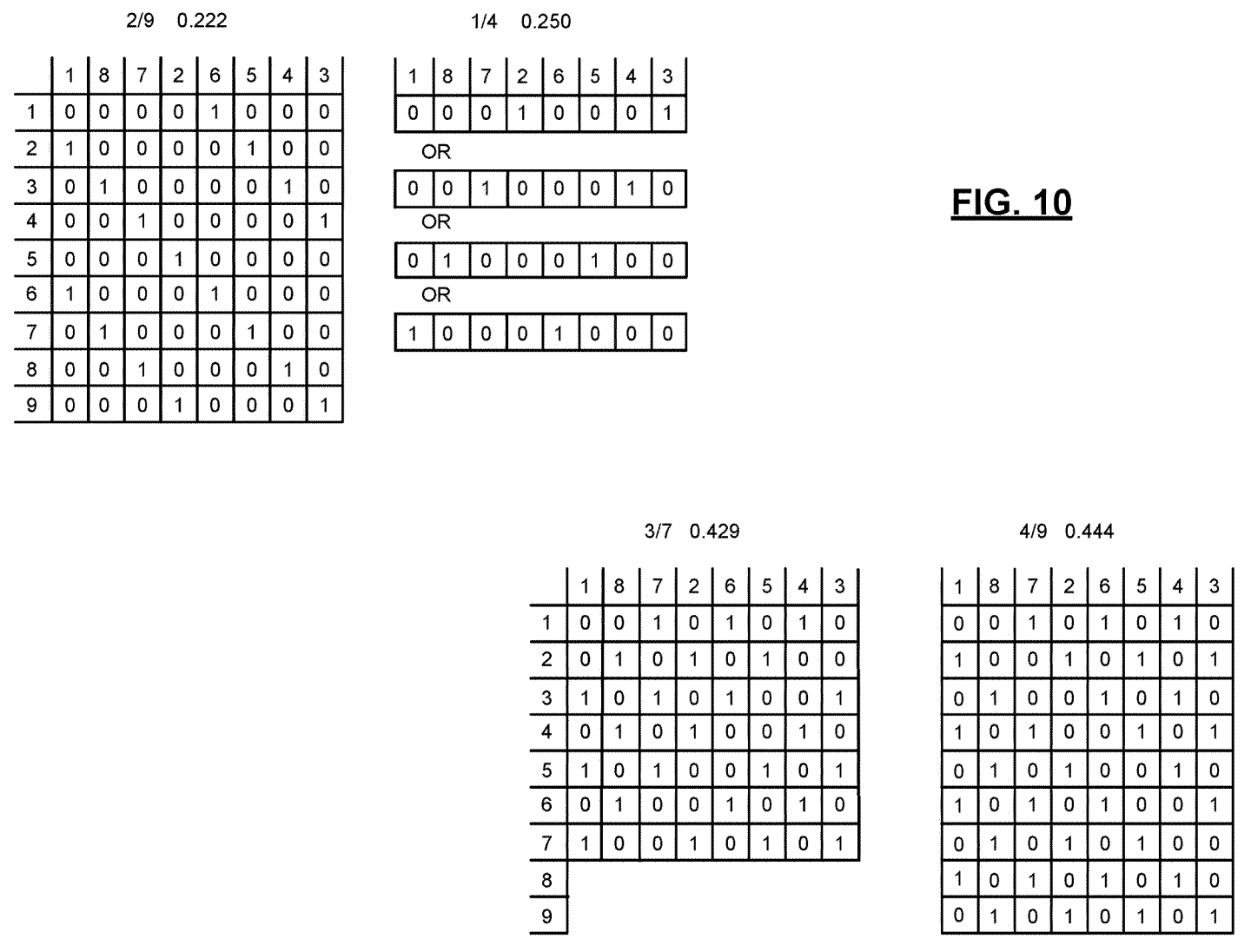

One or more predetermined firing patterns (or sequences) may be associated with each possible target firing fraction. Examples of predetermined firing patterns for firing fractions (FF) of 2/9, 1/4, 3/7, and 4/9 are provided are illustrated in FIG. 10. In FIG. 10, a 1 indicates that the respective cylinder in the firing order should be activated (and fired), and a 0 indicates that the respective cylinder in the firing order should be deactivated (and not fired). The rows of FIG. 10 correspond to different engine cycles (1, 2, 3, 4, 5, 6, 7, 8, 9, etc.), while the columns are for the individual cylinders in the firing order (1, 8, 7, 2, 6, 5, 4, 3) of the cylinders. An engine cycle refers to the period necessary for all of the cylinders of the engine to undergo one complete combustion cycle (e.g., 2 crankshaft revolutions). In FIG. 10, the example of an 8 cylinder engine with the firing order of the cylinders being cylinder 1, cylinder 8, cylinder 7, cylinder 2, cylinder 6, cylinder 5, cylinder 4, then cylinder 3, then starting over with cylinder 1. Based on the target firing fraction 252, the cylinder control module 244 may select a predetermined firing pattern and generate the activation/deactivation command 248 according to the selected predetermined firing pattern.

The cylinder control module 244 may determine the target firing fraction 252, for example, based on the torque request 208 and/or one or more other vehicle operating parameters. For example, the cylinder control module 244 may increase the target firing fraction 252 as the torque request 208 increases and vice versa.

Figure 3:
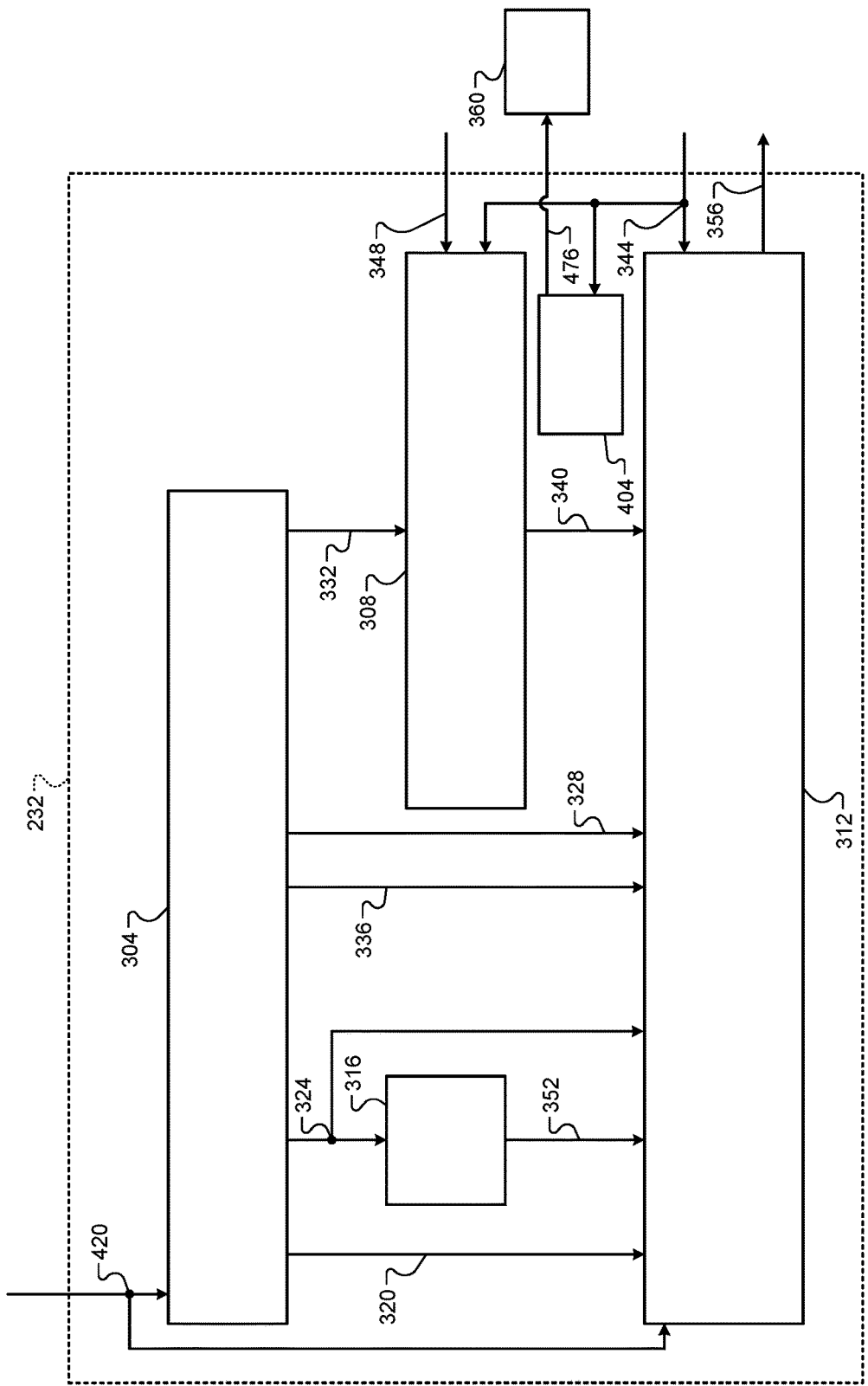
FIG. 3 is a functional block diagram of an example fuel control module.

FIG. 3 is a functional block diagram of an example implementation of the fuel control module 232. The fuel control module 232 may include a command generator module 304, an outer loop module 308, an inner loop module 312, and a reference generation module 316.

The command generator module 304 may determine one or more engine operating conditions. For example only, the engine operating conditions may include, but are not limited to, engine speed 320, air per cylinder (APC), engine load 324, and/or other suitable parameters. The APC may be predicted for one or more future combustion events in some engine systems. The engine load 324 may be determined based on, for example, a ratio of the APC to a maximum APC of the engine 102. The engine load 324 may alternatively be determined based on an indicated mean effective pressure (IMEP), engine torque, or another suitable parameter indicative of engine load.

The command generator module 304 also generates a base equivalence ratio (EQR) request 328. The base EQR request 328 may be generated based on an APC and to achieve a target equivalence ratio (EQR) of the air/fuel mixture upstream of the catalyst 136. For example only, the target EQR may include a stoichiometric EQR (i.e., 1.0). The command generator module 304 also determines a target downstream exhaust gas output (a target DS EGO) 332. The command generator module 304 may determine the target DS EGO 332 based on, for example, one or more of the engine operating conditions.

The command generator module 304 may also generate one or more open-loop fueling corrections 336 for the base EQR request 328. The open-loop fueling corrections 336 may include, for example, a sensor correction and an error correction. For example only, the sensor correction may correspond to a correction to the base EQR request 328 to accommodate the measurements of the US EGO sensor 138. The error correction may correspond to a correction in the base EQR request 328 to account for errors that may occur, such as errors in the determination of the APC and errors attributable to provision of fuel vapor to the engine 102 (i.e., fuel vapor purging).

The outer loop module 308 may also generate one or more open-loop fueling corrections 340 for the base EQR request 328. The outer loop module 308 may generate, for example, an oxygen storage correction and an oxygen storage maintenance correction. For example only, the oxygen storage correction may correspond to a correction in the base EQR request 328 to adjust the oxygen storage of the catalyst 136 to a target oxygen storage within a predetermined period. The oxygen storage maintenance correction may correspond to a correction in the base EQR request 328 to modulate the oxygen storage of the catalyst 136 at approximately the target oxygen storage.

The outer loop module 308 may estimate the oxygen storage of the catalyst 136 based on the US EGO signal 344 from the US EGO sensor 138 and the DS EGO signal 348 from the DS EGO sensor 139. The outer loop module 308 may generate the open-loop fueling corrections 340 to adjust the oxygen storage of the catalyst 136 to the target oxygen storage and/or to maintain the oxygen storage at approximately the target oxygen storage. The outer loop module 308 may also generate the open-loop fueling corrections 340 to minimize a difference between the DS EGO signal and the target DS EGO 332.

The inner loop module 312 determines an upstream EGO correction (US EGO correction) based on a difference between the US EGO signal 344 and an expected US EGO. The US EGO correction may correspond to, for example, a correction in the base EQR request 328 to minimize the difference between the US EGO signal 344 and the expected US EGO.

The reference generation module 316 generates a reference signal 352. For example only, the reference signal 352 may include a sinusoidal wave, triangular wave, or another suitable type of periodic signal. The reference generation module 316 may selectively vary the amplitude and frequency of the reference signal 352. For example only, the reference generation module 316 may increase the frequency and amplitude as the engine load 324 increases and vice versa. The reference signal 352 may be provided to the inner loop module 312 and one or more other modules.

The reference signal 352 may be used to generate a final EQR request 356. The reference signal 352 may toggle the EQR of the exhaust gas provided to the catalyst 136 between a predetermined rich EQR and a predetermined lean EQR and vice versa. For example only, the predetermined rich EQR may be approximately 3 percent rich (e.g., an EQR of 1.03), and the predetermined lean EQR may be approximately 3 percent lean (e.g., an EQR of approximately 0.97). Toggling the EQR may improve the efficiency of the catalyst 136. Additionally, toggling the EQR from the predetermined rich EQR to the predetermined lean EQR and vice versa may be useful in diagnosing faults in the US EGO sensor 138, the catalyst 136, and/or the DS EGO sensor 139.

The inner loop module 312 determines the final EQR request 356 based on the base EQR request 328 and the US EGO correction. The inner loop module 312 determines the final EQR request 356 further based on the sensor correction, the error correction, the oxygen storage correction, and the oxygen storage maintenance correction, and the reference signal 352. For example only, the inner loop module 312 may set the final EQR request 356 based on or equal to a sum of the base fuel request 328, the US EGO correction, the sensor correction, the error correction, the oxygen storage correction, and the oxygen storage maintenance correction, and the reference signal 352. The fuel actuator module 124 controls fuel injection to the next cylinder to be fueled based on the final EQR request 356. For example only, the fuel actuator module 124 may control fuel injection using pulse width modulation (PWM).

Figure 4:
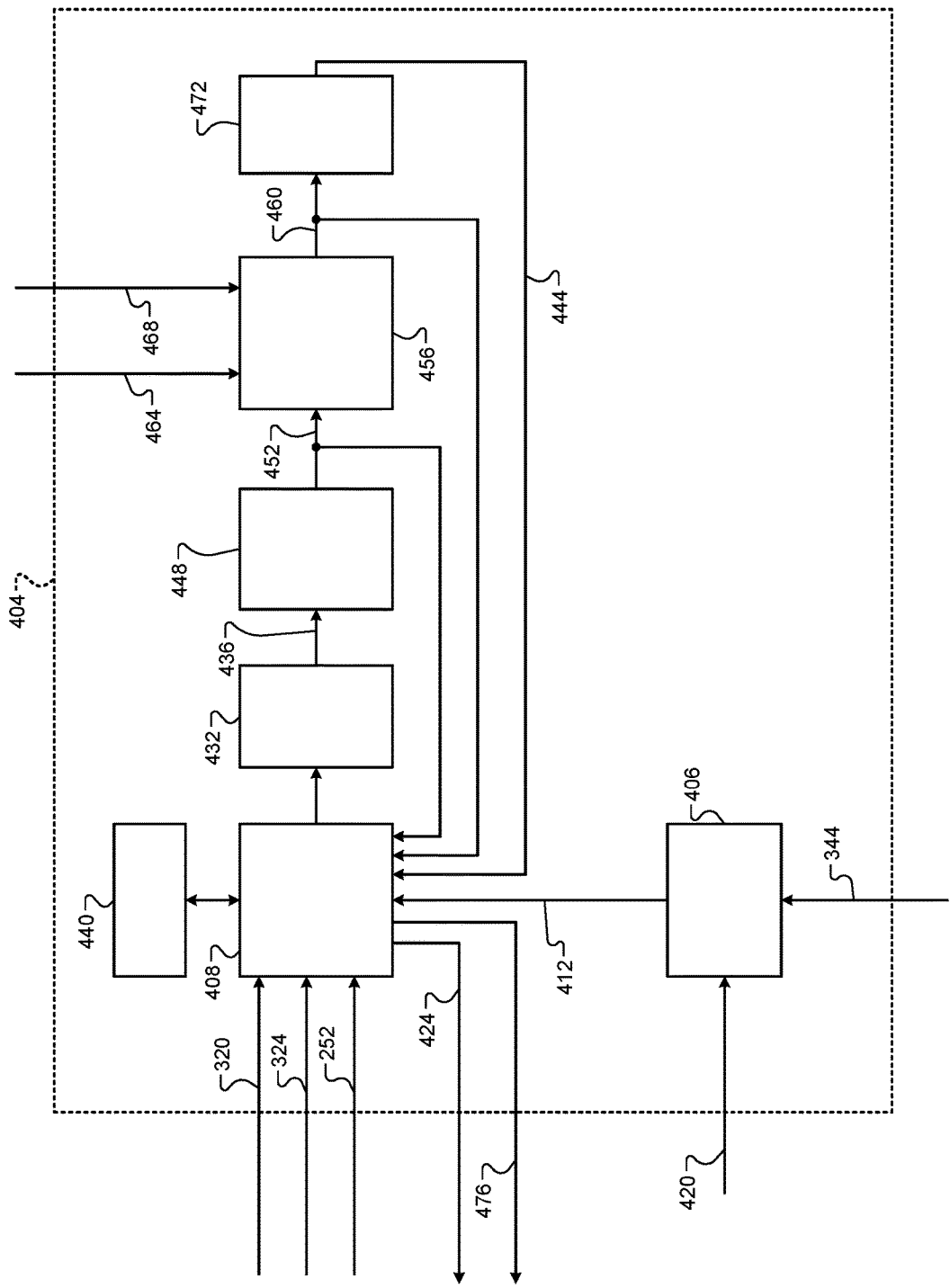
FIG. 4 is a functional block diagram of an example air fuel imbalance (AFIM) module.

Referring again to FIG. 3, the fuel control module 232 also includes an air fuel imbalance (AFIM) module 404 (see also FIG. 4). The AFIM module 404 stores samples of the US EGO signal 344 from the US EGO sensor 138. The AFIM module 404 diagnoses whether an AFIM fault is present based on the samples.

The AFIM module 404 may take one or more remedial actions when an AFIM fault is diagnosed. For example, the AFIM module 404 may store an indicator of the AFIM fault in memory of the ECM 114 (e.g., a predetermined diagnostic trouble code associated with AFIM faults), generate a visual indicator of the presence of a fault (e.g., illuminate an indicator 360, such as a malfunction indicator lamp), adjust fueling to one or more cylinders, and/or perform one or more other remedial actions when the AFIM fault is diagnosed.

Operation using target firing fractions of less than 1, however, may affect the diagnosis of whether the AFIM fault is present. According to the present application, in various implementations, the AFIM module 404 may command that the cylinder control module 244 set the target firing fraction to a predetermined firing fraction for the diagnosis of whether the AFIM fault is present. The AFIM module 404 may issue the command when one or more AFIM diagnostic enabling conditions are satisfied or, for example, in response to engine startup and independent of whether the AFIM diagnostic enabling conditions are satisfied.

In various implementations, the cylinder control module 244 may set the target firing fraction to the predetermined firing fraction. In various implementations, the cylinder control module 244 may use the predetermined firing fraction as a minimum for setting the target firing fraction. More specifically, the cylinder control module 244 may determine the target firing fraction (e.g., based on the torque request 208, as discussed above). When the determined target firing fraction is less than or equal to the predetermined firing fraction, the cylinder control module 244 may set the target firing fraction to the predetermined firing fraction. When the determined target firing fraction is greater than the predetermined firing fraction, the cylinder control module 244 may set the target firing fraction to the determined target firing fraction.

In various implementations, the AFIM module 404 may command the use of one or more predetermined firing patterns for the diagnosis of whether the AFIM fault is present. For example, the AFIM module 404 may command the use of a first predetermined firing pattern (e.g., for one-half of the cylinders of the engine 102 being activated) for a first predetermined period and command the use of a second predetermined firing pattern (e.g., for the other one-half of the cylinders of the engine 102 being activated) for a second predetermined period. The AFIM module 404 may issue the command when the AFIM diagnostic enabling conditions are satisfied or, for example, in response to engine startup and independent of whether the AFIM diagnostic enabling conditions are satisfied.

In various implementations, the AFIM module 404 may perform the AFIM diagnostic passively. For example, the AFIM module 404 may collect samples for the AFIM diagnostic when the AFIM diagnostic enabling conditions are satisfied and the target firing fraction is greater than or equal to a predetermined minimum firing fraction for performing the AFIM diagnostic.

FIG. 4 is a functional block diagram of an example implementation of the AFIM module 404. A sampling module 406 selectively samples the US EGO signal 344 and provides US EGO samples 412 to a diagnostic module 408. The sampling module 406 may sample the US EGO signal 344 at a predetermined rate, such as once per predetermined number of crankshaft angle degrees (CAD) as indicated by a crankshaft position 420 measured using the crankshaft position sensor 180. The sampling module 406 may also digitize the samples to produce the US EGO samples 412.

The diagnostic module 408 performs the diagnosis of whether the AFIM fault is present. The diagnostic module 408 also determine whether to perform the AFIM diagnostic based on the US EGO samples 412 and/or generates a cylinder activation/deactivation command 424 for the performance of the AFIM diagnostic based on the US EGO samples 412 generated during execution of the command 424.

Figure 5A:
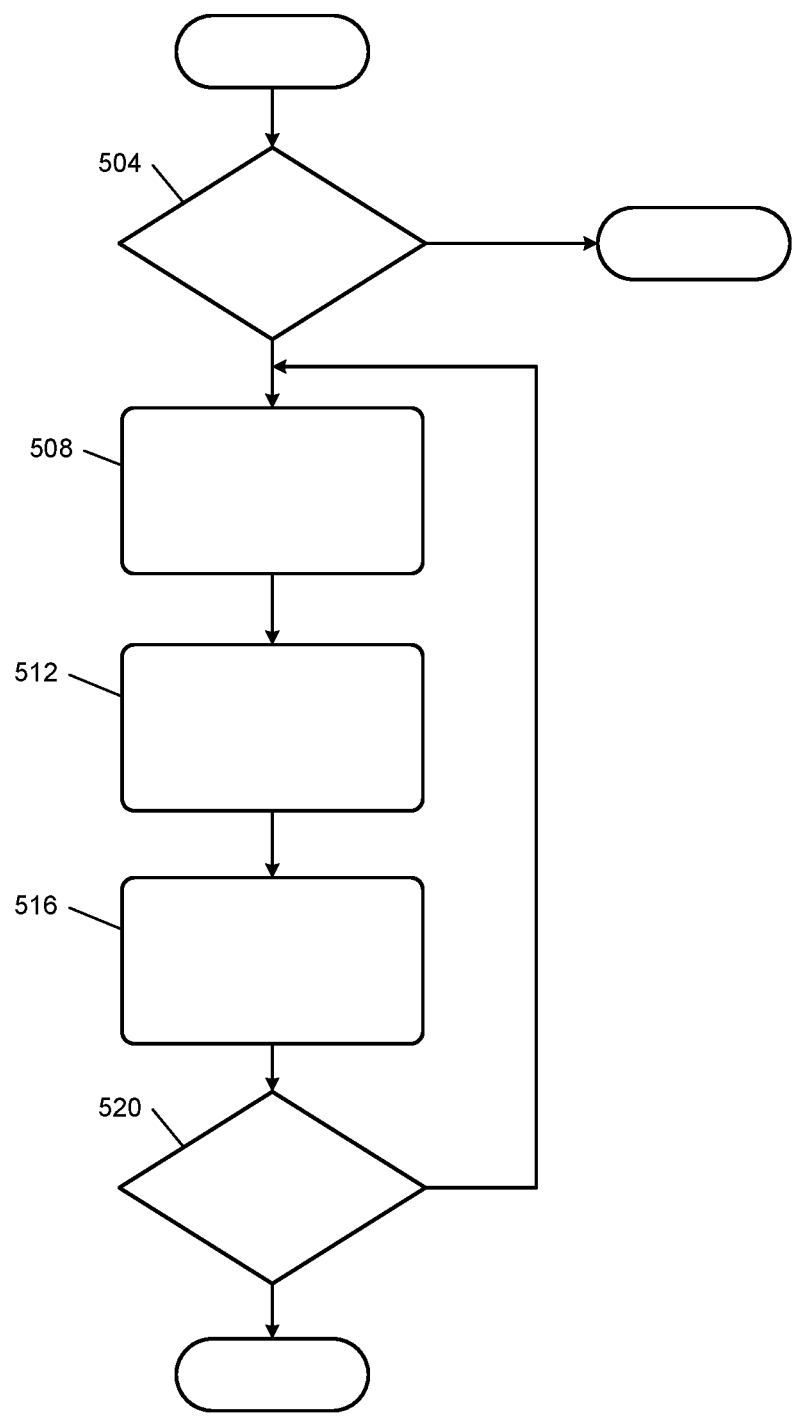
FIGS. 5A-5B are flowcharts depicting example methods of performing an AFIM diagnostic and commanding the use of a predetermined firing fraction for the AFIM diagnostic.

FIG. 5A is a flowchart depicting an example method of performing the AFIM diagnostic and commanding the use of a predetermined firing fraction. Control may begin with 504. At 504, the diagnostic module 408 may determine whether the AFIM diagnostic has been performed (e.g., passed) previously during the present drive cycle. A drive cycle may refer to the period between a first time when a driver turns on the ignition system of the vehicle (e.g., via an ignition key, button or switch) and a second time when the driver next turns off the ignition system of the vehicle. If 504 is true, control may end. At 504 is false, control may continue with 508.

At 508, the diagnostic module 408 may generate the command 424 to command the use of a predetermined firing fraction. The predetermined firing fraction may be, for example, 1, ½, or another firing fraction suitable for the AFIM diagnostic. At 512, the cylinder control module 244 sets the target firing fraction 252 to the predetermined firing fraction, determines the target firing pattern based on the target firing fraction 252, and generates the activation/deactivation command 248 according to the target firing pattern. The cylinder control module 244 activates or deactivates the next cylinder in the firing order of the cylinders based on the activation/deactivation command 248.

At 516, the diagnostic module 408 enables use of the US EGO samples 412 for the AFIM diagnostic. Performance of the AFIM diagnostic is discussed further below. At 520, the diagnostic module 408 may determine whether performance of the AFIM diagnostic is complete for the present drive cycle. If 520 is true, control may end, and the cylinder control module 244 may determine the target firing fraction 252 based on the torque request 208. If 520 is false, control may return to 508 to continue using the predetermined firing fraction for performing the AFIM diagnostic.

Figure 5B:
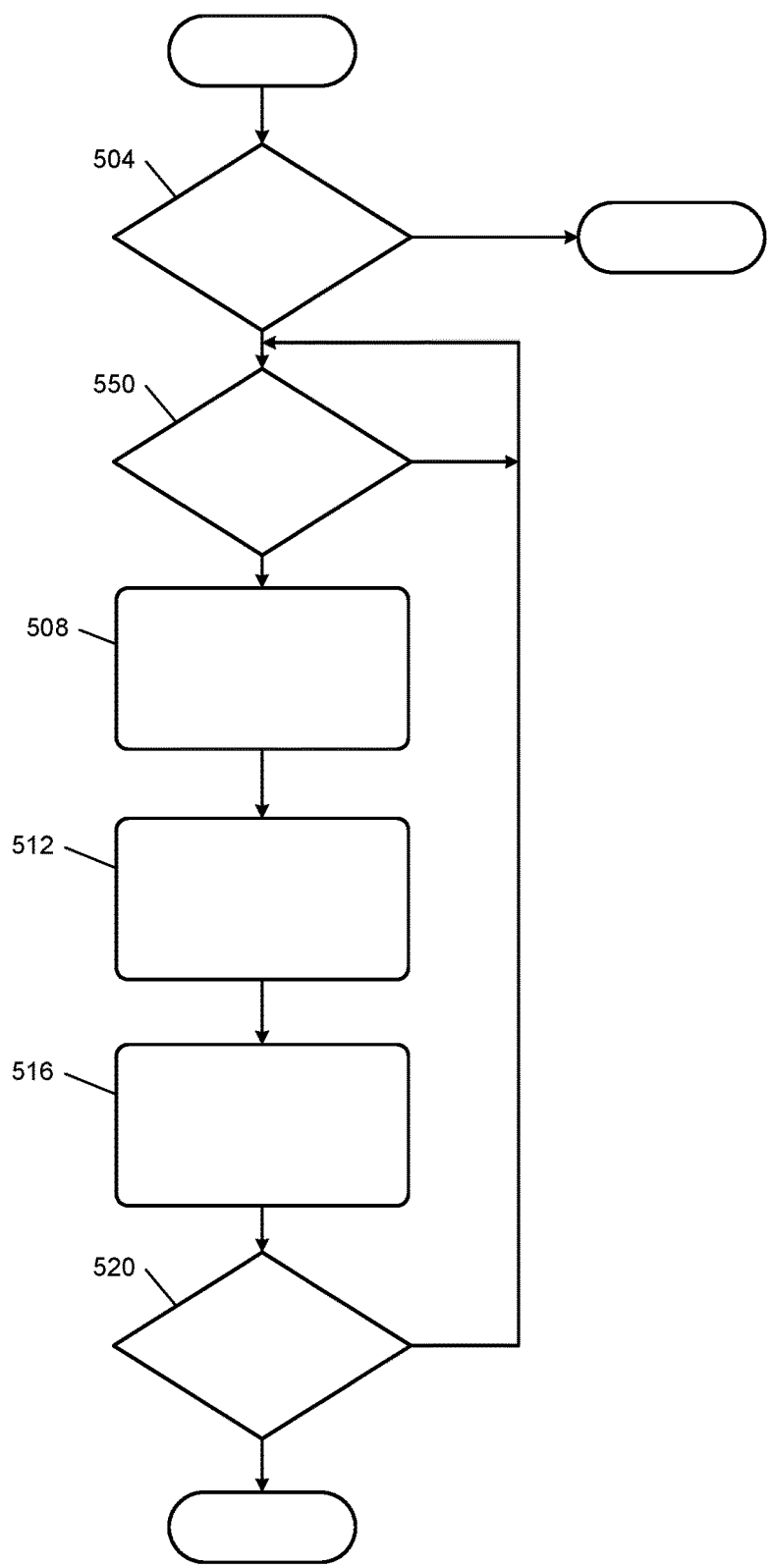

As shown in FIG. 5B, the diagnostic module 408 may determine whether the AFIM enabling condition(s) are satisfied at 550 before continuing with 508. For example, the diagnostic module 408 may determine whether the engine speed 320 is within the predetermined speed range and the engine load 324 is within the predetermined engine load range. If 550 is true, control may continue with 508. If 550 is false, control may remain at 550. In the example of FIG. 5A, control may continue to 508 regardless of whether the AFIM enabling conditions are satisfied.

Figure 6A:
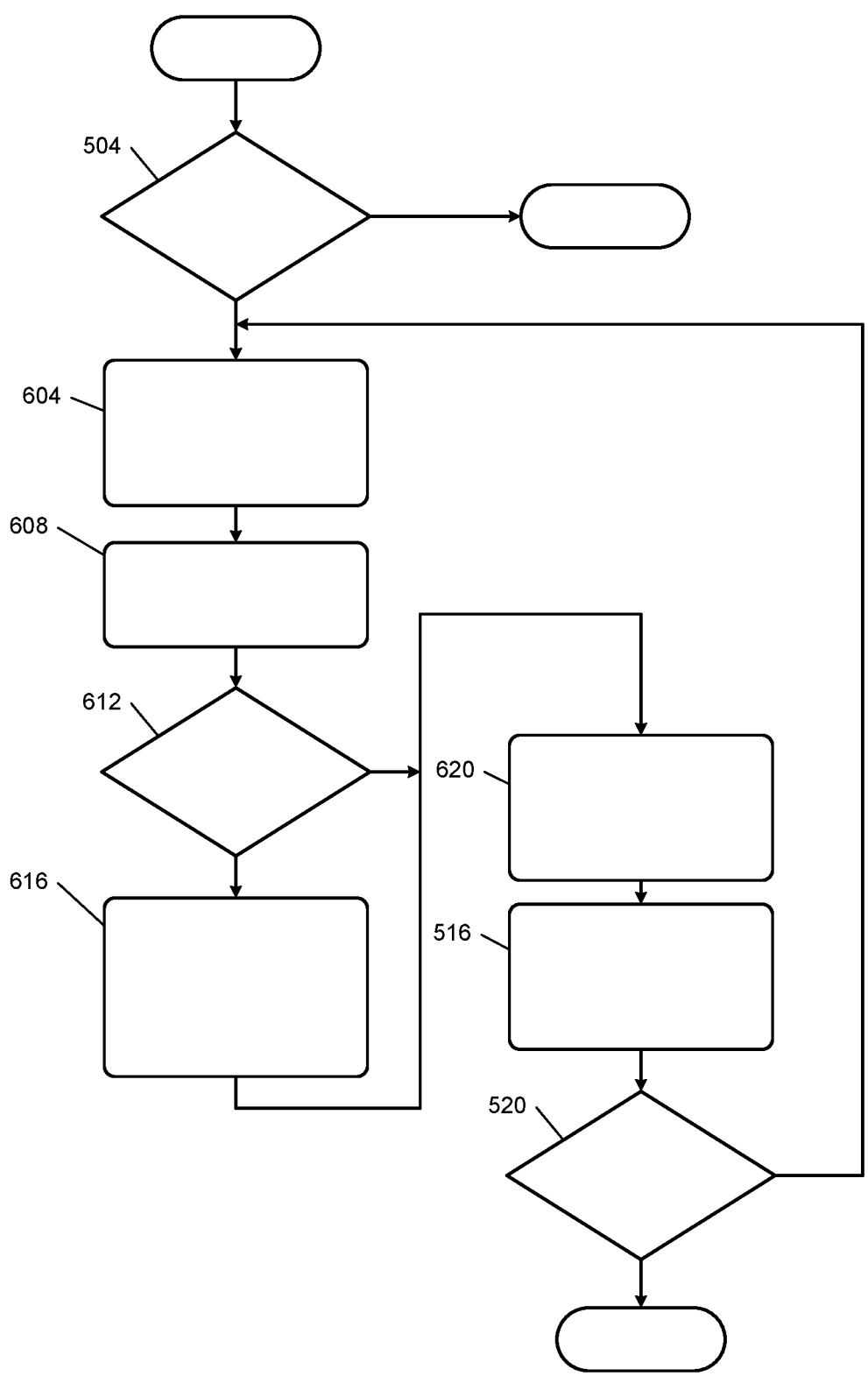
FIGS. 6A-6B are flowcharts depicting example methods of performing the AFIM diagnostic and commanding the use of a predetermined minimum firing fraction for the AFIM diagnostic.

FIG. 6A is a flowchart depicting an example method of performing the AFIM diagnostic and commanding the use of a predetermined minimum firing fraction. Control may begin with 504, as discussed above.

At 604, the diagnostic module 408 may generate the command 424 to command the use of a predetermined minimum firing fraction. The predetermined minimum firing fraction may be, for example, ½, greater than ½, or another firing fraction suitable for the AFIM diagnostic. At 608, the cylinder control module 244 determines the target firing fraction 252 based on the torque request 208. At 612, the cylinder control module 244 determines whether the target firing fraction 252 is greater than the predetermined minimum firing fraction. If 612 is false, the cylinder control module 244 sets the target firing fraction equal to the predetermined minimum firing fraction at 616, and control continues with 620. If 612 is true, control transfers to 620.

At 620, the cylinder control module 244 determines the target firing pattern based on the target firing fraction 252 and generates the activation/deactivation command 248 according to the target firing pattern. The cylinder control module 244 activates or deactivates the next cylinder in the firing order of the cylinders based on the activation/deactivation command 248. Control and continues with 516 and 520, as discussed above.

Figure 6B:
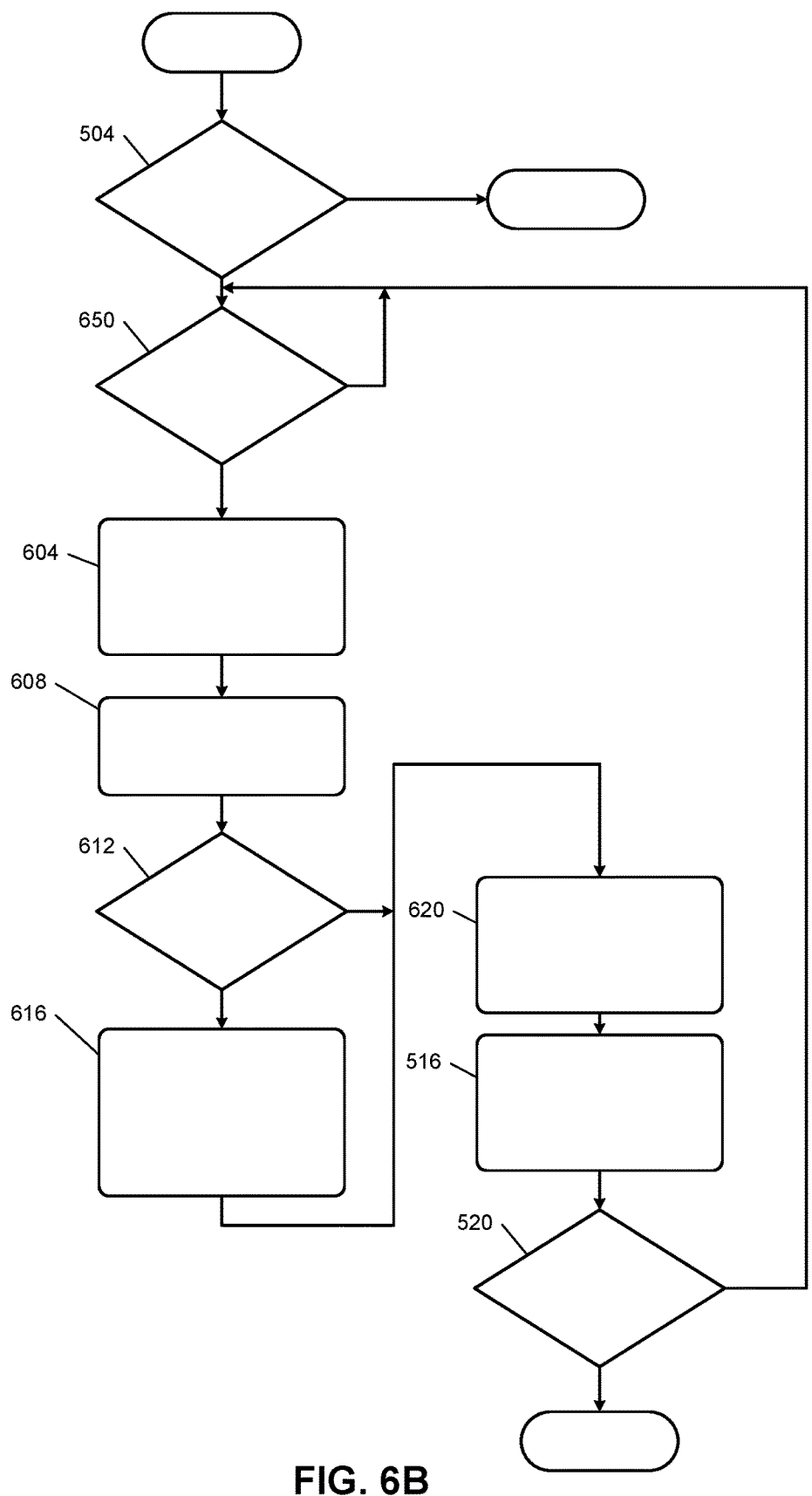

As shown in FIG. 6B, the diagnostic module 408 may determine whether the AFIM enabling condition(s) are satisfied at 650 before continuing with 604. For example, the diagnostic module 408 may determine whether the engine speed 320 is within the predetermined speed range and the engine load 324 is within the predetermined engine load range. If 650 is true, control may continue with 604. If 650 is false, control may remain at 650. In the example of FIG. 6A, control may continue to 604 regardless of whether the AFIM enabling conditions are satisfied.

Figure 7A:
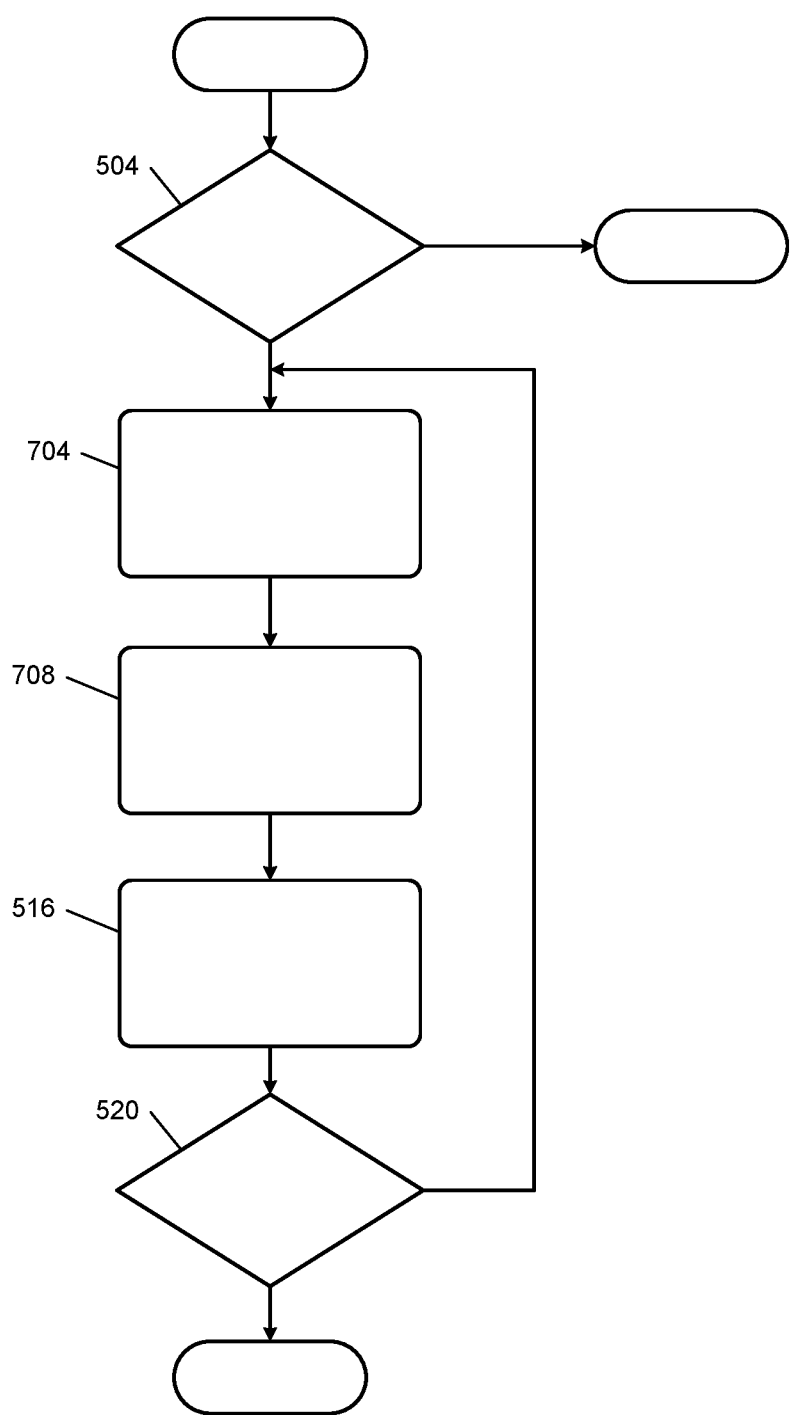
FIGS. 7A-7B are flowcharts depicting example methods of performing the AFIM diagnostic and commanding the use of one or more predetermined firing patterns for the AFIM diagnostic.

FIG. 7A is a flowchart depicting an example method of performing the AFIM diagnostic and commanding the use of one or more predetermined firing patterns. Control may begin with 504, as discussed above.

At 704, the diagnostic module 408 may generate the command 424 to command the use of one or more of the predetermined firing patterns. For example, the diagnostic module 408 may command the use of a first one of the predetermined firing patterns for a first predetermined period then command use of a second one of the predetermined firing patterns for a second predetermined period immediately following the first predetermined period. The first one of the predetermined firing patterns may be different. For example only, the first one of the predetermined firing patterns may be for activating one-half of all of the cylinders of the engine 102 and deactivating the other one-half of the cylinders of the engine 102. The second one of the predetermined firing patterns may be for activating the other one-half of the cylinders of the engine 102 and deactivating the one-half of the cylinders of the engine 102. The first and second predetermined periods may be the same or different lengths and may be, for example, numbers of engine cycles. While the example of two predetermined firing patterns and predetermined periods is provided, different predetermined firing patterns and/or predetermined periods may be used. Also, more or less predetermined firing patterns and/or predetermined periods may be used.

At 708, the cylinder control module 244 sets the determines the target firing pattern according to the predetermined firing pattern(s), and generates the activation/deactivation command 248 according to the target firing pattern. The cylinder control module 244 activates or deactivates the next cylinder in the firing order of the cylinders based on the activation/deactivation command 248. Control then continues with 516 and 520, as discussed above.

Figure 7B:
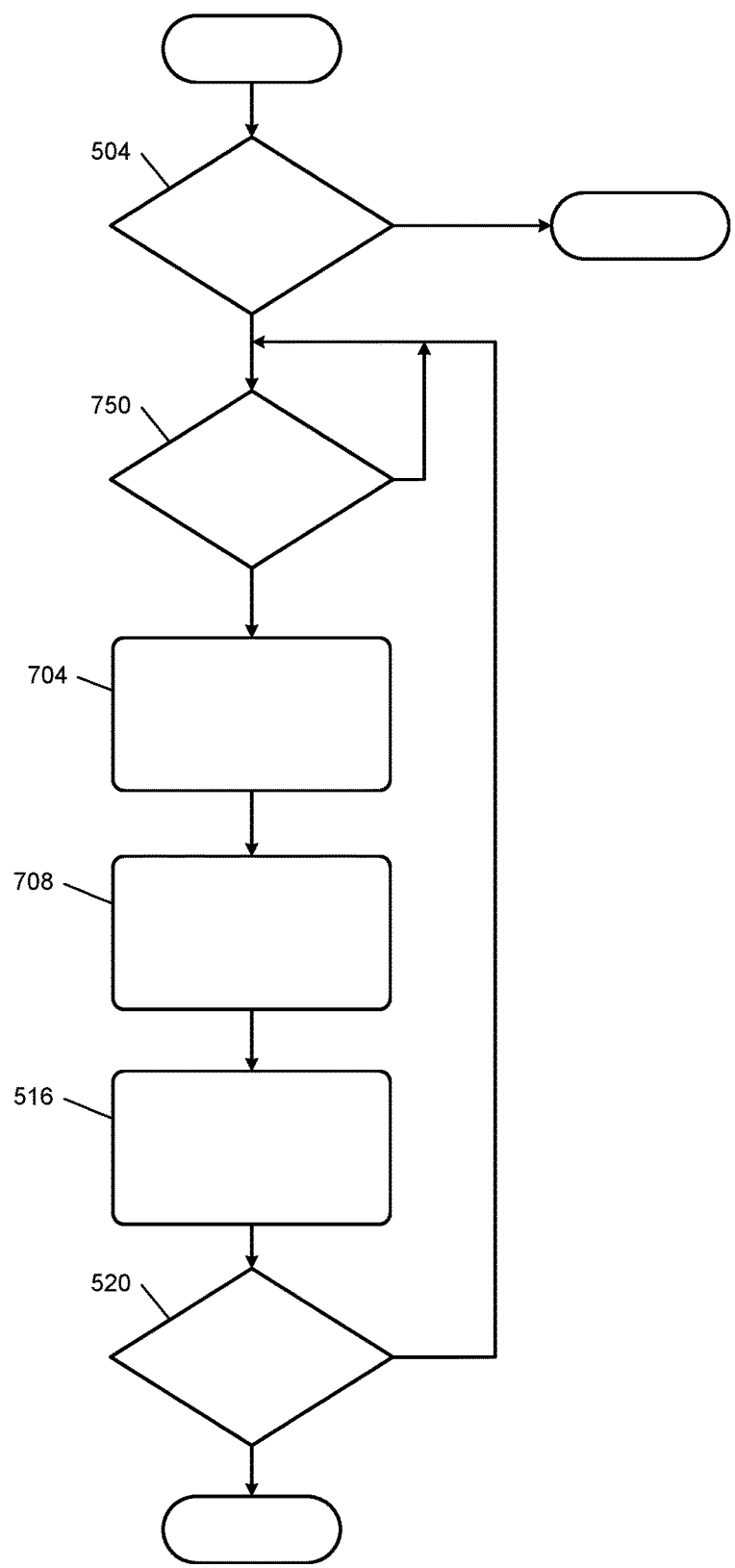

As shown in FIG. 7B, the diagnostic module 408 may determine whether the AFIM enabling condition(s) are satisfied at 750 before continuing with 704. For example, the diagnostic module 408 may determine whether the engine speed 320 is within the predetermined speed range and the engine load 324 is within the predetermined engine load range. If 750 is true, control may continue with 704. If 750 is false, control may remain at 750. In the example of FIG. 7A, control may continue to 704 regardless of whether the AFIM enabling conditions are satisfied.

Figure 8:
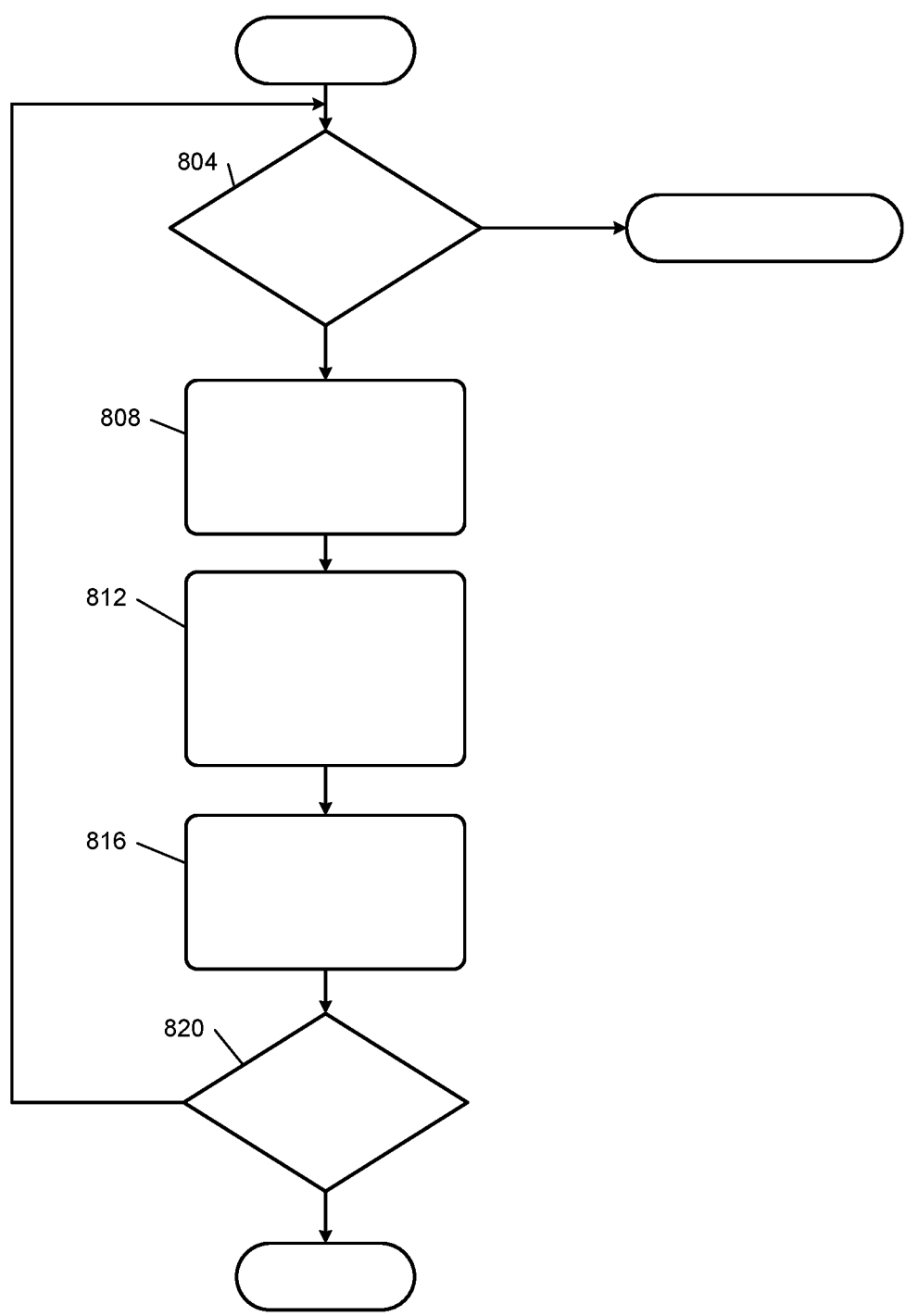
FIG. 8 is a flowchart depicting an example method of performing the AFIM diagnostic in response to an AFIM diagnostic triggering event.

FIG. 8 is a flowchart depicting an example method of performing the AFIM diagnostic in response to an AFIM diagnostic triggering event. Control may begin with 804 where the diagnostic module 408 determines whether non-volatile memory (NVM) of the ECM 114 has been reset, one or more predetermined fault indicators (e.g., predetermined DTCs associated with faults) have been cleared from the memory, and/or whether one or more other conditions for resetting stored AFIM diagnostic data are present. For example, as discussed further below, a condition for resetting the stored AFIM diagnostic data includes when a normalized value determined based on the US EGO samples 412 during performance of the AFIM diagnostic is greater than a predetermined value. If 804 is true, control may continue with 808. If 804 is false, control may perform the AFIM diagnostic without commanding the use of a predetermined firing fraction, a predetermined minimum firing fraction, or one or more predetermined firing patterns. For example, if 804 is false, control may continue with FIG. 9, which is discussed further below.

At 808, the diagnostic module 408 may generate the command 424 to command the use of a predetermined firing fraction of 1. Based on the predetermined firing fraction of 1, all cylinders of the engine 102 will be activated. The diagnostic module 408 also resets stored AFIM data, as discussed further below, at 808. At 812, the cylinder control module 244 sets the target firing fraction 252 to the predetermined firing fraction, determines the target firing pattern based on the target firing fraction 252, and generates the activation/deactivation command 248 according to the target firing pattern. Based on the predetermined firing fraction of 1, the target firing pattern is to activate all cylinders, and the cylinder control module 244 activates the next cylinder in the firing order of the cylinders based on the activation/deactivation command 248.

At 816, the diagnostic module 408 enables use of the US EGO samples 412 for the AFIM diagnostic. Performance of the AFIM diagnostic is discussed further below. At 820, the diagnostic module 408 may determine whether performance of the AFIM diagnostic is complete for the present drive cycle. If 820 is true, control may end, and the cylinder control module 244 may determine the target firing fraction 252 based on the torque request 208. If 820 is false, control may return to 804, for example, to continue maturing AFIM stored data as discussed below, using the predetermined firing fraction for performing the AFIM diagnostic. Once the AFIM stored data has matured (e.g., a predetermined amount of AFIM data has been obtained) to diagnose whether the AFIM fault is present (or not), the AFIM diagnostic will complete and control will end.

Figure 9:
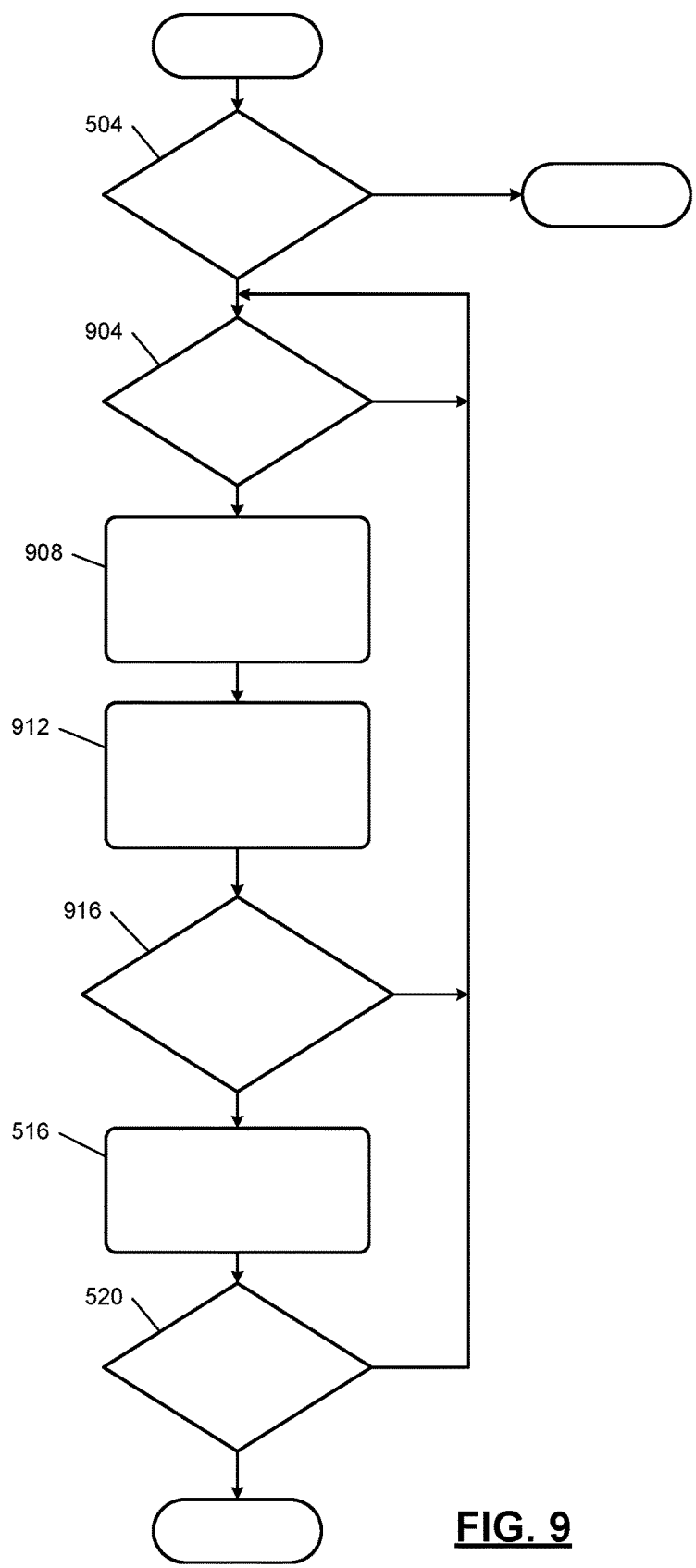
FIG. 9 is a flowchart depicting an example method of performing the AFIM diagnostic without commanding the use of a predetermined firing pattern or a predetermined firing fraction.

FIG. 9 is a flowchart depicting an example method of performing the AFIM diagnostic without commanding the use of a predetermined firing fraction, a predetermined minimum firing fraction, or one or more predetermined firing patterns. Control may begin with 504 as discussed above.

At 904, the diagnostic module 408 may determine whether the AFIM enabling condition(s) are satisfied. For example, the diagnostic module 408 may determine whether the engine speed 320 is within the predetermined speed range and the engine load 324 is within the predetermined engine load range. If 904 is true, control may continue with 908. If 904 is false, control may remain at 904.

At 908, the cylinder control module 244 determines the target firing fraction 252 based on the torque request 208. At 912, the cylinder control module 244 determines the target firing pattern based on the target firing fraction 252 and generates the activation/deactivation command 248 according to the target firing pattern. The cylinder control module 244 activates or deactivates the next cylinder in the firing order of the cylinders based on the activation/deactivation command 248.

At 916, the diagnostic module 408 may determine whether the target firing fraction 252 is greater than the predetermined minimum firing fraction. The predetermined minimum firing fraction may be, for example, ½, greater than ½, or another firing fraction suitable for the AFIM diagnostic. If 916 is true, control continues with 516 and 520, as discussed above. If 916 is false, control returns to 904.

Referring back to FIG. 4, the diagnostic module 408 provides the US EGO samples 412 to a variance module 432 when the determination is made to perform the AFIM diagnostic, as discussed above. The variance module 432 monitors the US EGO samples 412 and may store the US EGO samples 412. The variance module 432 determines an average (not shown) of a predetermined number of the US EGO samples 412. For example only, the predetermined number of the US EGO samples 412 may be one engine cycle worth of the most recent US EGO samples 412. The average may include a weighted average or another suitable type of average. The variance module 432 may update the average each time that a new US EGO sample 412 is received based on the predetermined number of the US EGO samples 412 including the new US EGO sample 412.

The variance module 432 determines a variance value 436 each time that a US EGO sample 412 is received. The variance module 432 determines the variance value 436 based on a difference between the average and the US EGO sample 412. A variance value 436 of zero indicates that an output of the cylinder associated with the variance value 436 is balanced relative to an average output of the cylinders.

The variance module 432 stores at least a predetermined number of the variance values 436. In this manner, at least a predetermined number (N) of the most recently determined variance values 436 may be stored in the variance module 432, where N is an integer. N may be may be set to, for example, at least a predetermined minimum number of variance values 436 that is based on the number of US EGO samples 412 taken per engine cycle. For example only, the predetermined minimum number may be equal to two times the rate of combustion events monitored by the US EGO sensor 138 per engine cycle. The diagnostic module 408 increments a counter value tracked by a counter module 440 each time that a US EGO sample 412 is received for the AFIM diagnostic.

When the variance value 436 is less than a first predetermined value, the diagnostic module 408 may diagnose that the AFIM fault is not present and end the AFIM diagnostic. When the AFIM diagnostic is ended, the cylinder control module 244 returns to normal determination of the target firing fraction, if not already doing so (e.g., FIG. 9).

The diagnostic module 408 normally diagnoses whether the AFIM fault is present based on a filtered value 444, which is discussed further below. The filtered value 444 is determined once a predetermined number of the US EGO samples 412 have been collected for the AFIM diagnostic. Diagnosing that the AFIM fault is not present when the variance value 436 is less than the first predetermined value allows the diagnostic module 408 to diagnose that the AFIM fault is not present earlier than waiting for the predetermined number of the US EGO samples 412. When the variance value 436 is less than the first predetermined value, the presence of the AFIM fault could not possibly be diagnosed based on the filtered value 444, even if the remainder of the samples have a maximum possible variance.

An averaging module 448 determines an average value 452 of the variance values 436 determined. The averaging module 448 updates the average value 452 each time the variance value 436 is determined. For example, the averaging module 448 may set the average value 452 based on or equal to a sum of the variance values 436 determined divided the number of the variance values 436 summed. The number of variance values 436 used may be indicated by the counter value of the counter module 440.

When the average value 452 of the variance values 436 is less than a second predetermined value, the diagnostic module 408 may diagnose that the AFIM fault is not present and end the AFIM diagnostic. As stated above, the diagnostic module 408 normally diagnoses whether the AFIM fault is present based on the filtered value 444. Diagnosing that the AFIM fault is not present when the average value 452 is less than the second predetermined value allows the diagnostic module 408 to diagnose that the AFIM fault is not present earlier than waiting for the predetermined number of the US EGO samples 412. When the average value 452 is less than the second predetermined value, the presence of the AFIM fault could not possibly be diagnosed based on the filtered value 444, even if the remainder of the samples have a maximum possible variance.

A normalization module 456 normalizes the average value 452 to produce a normalized value 460. The normalization module 456 may normalize the average value 452, for example, based on a MAF 464 measured using the MAF sensor 186, a MAP 468 measured using the MAP sensor 184, and/or one or more other suitable parameters. The normalization module 456 may normalize the average value 452, for example, using one or more lookup tables and/or functions that relate averages to normalized values based on the MAF 464, the MAP 468, and/or the one or more other parameters. The normalization module 456 may also multiply the normalized value 460 by a scalar before outputting the normalized value 460. The scalar may be a fixed, predetermined value or may be determined based on one or more other parameters.

The normalization module 456 may normalize the average value 452 in response to a determination that the predetermined number of the US EGO samples 412 have been collected for the AFIM diagnostic. For example, the normalization module 456 may normalize the average when the counter value tracked by the counter module 440 is greater than or equal to the predetermined number of the US EGO samples 412.

A filtering module 472 applies a filter to the normalized value 460 and a predetermined number of previous values of the normalized value 460 to determine the filtered value 444. For example only, the filtering module 472 may apply a weighted moving average filter, such as exponentially weighted moving average filter with more recent values being weighted more heavily than older values. However, another suitable type of filter may be used. The predetermined number of previous values of the normalized value 460 is an integer and is greater than 1.

The normalized value 460 being greater than a third predetermined value may be an AFIM diagnostic triggering event (e.g., FIG. 8). The diagnostic module 408 may trigger multiple evaluations of AFIM diagnostic data when the normalized value 460 is greater than the third predetermined value. This can be done to more quickly mature the filtered value 444. Before beginning to obtain new AFIM diagnostic data, the diagnostic module 408 may reset previously stored AFIM diagnostic data. For example, the diagnostic module 408 may reset the counter value, reset collected ones of the US EGO samples 412, reset determined values of the variance value 436, reset determined values of the average value 452, reset values used by the normalization module 456, and reset the previous values of the normalized value 460.

The diagnostic module 408 diagnoses whether the AFIM fault is present based on the filtered value 444. For example, the diagnostic module 408 may indicate that the AFIM fault is present when the filtered value 444 is greater than a predetermined AFIM fault value. The diagnostic module 408 may indicate that the AFIM fault is not present when the filtered value 444 is less than the predetermined AFIM fault value. The diagnostic module 408 may indicate whether the AFIM fault is present or not via a fault signal 476. For example, the fault signal 476 may include a predetermined DTC in memory and the diagnostic module 408 may set the fault signal 476 to a first state when the AFIM fault is present and set the fault signal 476 to a second state when the AFIM fault is not present. The diagnostic module 408 may additionally or alternatively take one or more other remedial actions when the AFIM fault is present, such as adjusting fueling (e.g., increasing and/or decreasing fueling of specific cylinders) to decrease the air/fuel imbalance of the cylinders and/or illuminating the indicator 360.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. An engine control system comprising:
a torque request module that determines a torque request for an engine based on a driver input;
a cylinder control module that, based on the torque request, determines a target fraction of a number of cylinders of the engine to be activated out of a total number of cylinders of the engine;
an air fuel imbalance (AFIM) module that selectively commands that the cylinder control module set the target fraction to a predetermined fraction of the total number of cylinders of the engine to be activated,
wherein the cylinder control module further:
sets the target fraction to the predetermined fraction in response to the command; and
activates and deactivates opening of intake and exhaust valves of the cylinders of the engine based on the target fraction; and
wherein the AFIM module further, while the target firing fraction is set to the predetermined fraction, selectively diagnoses the presence of an AFIM fault based on samples of a signal from an oxygen sensor measuring oxygen in exhaust upstream of a catalyst of an exhaust system.

2. The engine control system of claim 1 further comprising a fuel control module that provides fuel to cylinders having activated intake and exhaust valves based on the target fraction and that disables fueling to cylinders having deactivated intake and exhaust valves based on the target fraction.

3. The engine control system of claim 1 wherein the AFIM module stores a predetermined diagnostic trouble code (DTC) in memory when the AFIM fault is present.

4. The engine control system of claim 1 wherein the AFIM module illuminates an indicator when the AFIM fault is present.

5. The engine control system of claim 1 wherein:
the AFIM module commands that the cylinder control module set the target fraction one of (i) greater than the predetermined fraction and (ii) equal to the predetermined fraction; and
the cylinder control module:
when the predetermined fraction is greater than the target fraction determined based on the torque request, sets the target fraction equal to the predetermined fraction; and
when the predetermined fraction is less than the target fraction determined based on the torque request, sets the target fraction equal to the target fraction determined based on the torque request.

6. The engine control system of claim 1 wherein the AFIM module commands that the cylinder control module set the target fraction to the predetermined fraction in response to determinations that an engine speed is within a predetermined speed range and that an engine load is within a predetermined engine load range.

7. The engine control system of claim 1 wherein the AFIM module commands that the cylinder control module set the target fraction to the predetermined fraction, independent of engine speed and independent of engine load.

8. An engine control system comprising:
a torque request module that determines a torque request for an engine based on a driver input;
a cylinder control module that:
based on the torque request, determines a target fraction of a number of cylinders of the engine to be activated out of a total number of cylinders of the engine; and
determines a target firing sequence for the cylinders to achieve the target fraction;
an air fuel imbalance (AFIM) module that selectively commands that the cylinder control module set the target firing sequence to a predetermined firing sequence,
wherein the cylinder control module further:
sets the target firing sequence to the predetermined firing sequence in response to the command; and
activates and deactivates opening of intake and exhaust valves of the cylinders of the engine in order according to the target firing sequence; and
wherein the AFIM module further, while the target firing sequence is set to the predetermined firing sequence, selectively diagnoses the presence of an AFIM fault based on samples of a signal from an oxygen sensor measuring oxygen in exhaust upstream of a catalyst of an exhaust system.

9. The engine control system of claim 8 further comprising a fuel control module that provides fuel to cylinders having activated intake and exhaust valves based on the target firing sequence and that disables fueling to cylinders having deactivated intake and exhaust valves based on the target firing sequence.

10. The engine control system of claim 8 wherein the AFIM module stores a predetermined diagnostic trouble code (DTC) in memory when the AFIM fault is present.

11. The engine control system of claim 8 wherein the AFIM module illuminates an indicator when the AFIM fault is present.

12. The engine control system of claim 8 wherein the AFIM module commands that the cylinder control module set the target firing sequence to the predetermined firing sequence in response to determinations that an engine speed is within a predetermined speed range and that an engine load is within a predetermined engine load range.

13. The engine control system of claim 8 wherein the AFIM module commands that the cylinder control module set the target firing sequence to the predetermined firing sequence, independent of engine speed and independent of engine load.

14. An engine control system comprising:
a torque request module that determines a torque request for an engine based on a driver input;
a cylinder control module that:
based on the torque request, determines a target fraction of a number of cylinders of the engine to be activated out of a total number of cylinders of the engine; and
activates and deactivates opening of intake and exhaust valves of the cylinders of the engine based on the target fraction; and
an air fuel imbalance (AFIM) module that selectively diagnoses the presence of an AFIM fault based on samples of a signal from an oxygen sensor measuring oxygen in exhaust upstream of a catalyst of an exhaust system received when the target fraction is greater than a predetermined minimum fraction of the total number of cylinders of the engine.

15. The engine control system of claim 14 wherein the AFIM module selectively diagnoses the presence of an AFIM fault based on samples of the signal from the oxygen sensor when both (i) the target fraction is greater than the predetermined minimum fraction of the total number of cylinders of the engine and (ii) an engine speed is within a predetermined engine speed range.

16. The engine control system of claim 14 wherein the AFIM module selectively diagnoses the presence of an AFIM fault based on samples of the signal from the oxygen sensor when all of:
   (i) the target fraction is greater than the predetermined minimum fraction of the total number of cylinders of the engine;
   (ii) an engine speed is within a predetermined engine speed range; and
   (iii) an engine load is within a predetermined engine load range.

17. The engine control system of claim 14 further comprising a fuel control module that provides fuel to cylinders having activated intake and exhaust valves based on the target fraction and that disables fueling to cylinders having deactivated intake and exhaust valves based on the target fraction.

18. The engine control system of claim 14 wherein the AFIM module stores a predetermined diagnostic trouble code (DTC) in memory when the AFIM fault is present.

19. The engine control system of claim 14 wherein the AFIM module illuminates an indicator when the AFIM fault is present.

\* \* \* \* \*